United States Patent
Hirade et al.

(10) Patent No.: US 12,275,855 B2
(45) Date of Patent: Apr. 15, 2025

(54) PRINTING METHOD, PRINTING DEVICE, PRINTED MATTER, AND SET OF PROCESSING FLUID AND INK

(71) Applicants: Tomohiro Hirade, Kanagawa (JP); Toshiyuki Kobashi, Tokyo (JP); Makoto Kuronuma, Kanagawa (JP)

(72) Inventors: Tomohiro Hirade, Kanagawa (JP); Toshiyuki Kobashi, Tokyo (JP); Makoto Kuronuma, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 162 days.

(21) Appl. No.: 18/065,787

(22) Filed: Dec. 14, 2022

(65) Prior Publication Data

US 2023/0193065 A1 Jun. 22, 2023

(30) Foreign Application Priority Data

Dec. 17, 2021 (JP) .................................. 2021-205057
Jul. 21, 2022 (JP) .................................. 2022-116239

(51) Int. Cl.
*C09D 11/38* (2014.01)
*C09D 11/322* (2014.01)
*D06P 5/30* (2006.01)

(52) U.S. Cl.
CPC ............ *C09D 11/38* (2013.01); *C09D 11/322* (2013.01); *D06P 5/30* (2013.01)

(58) Field of Classification Search
CPC ....... C09D 11/38; C09D 11/322; C09D 11/10; C09D 11/12; C09D 11/40; C09D 11/54; D06P 5/30; D06P 1/525; D06P 1/44; D06P 1/5257; D06P 1/5285; D06P 1/5292; D06P 1/54; D06P 1/65118; D06P 1/6533; D06P 1/67333; D06P 1/6735; D06P 5/002; D06P 5/22; D06P 5/225
See application file for complete search history.

(56) References Cited

U.S. PATENT DOCUMENTS

| | | |
|---|---|---|
| 2017/0349772 A1 | 12/2017 | Hirade et al. |
| 2019/0031897 A1 | 1/2019 | Hirade et al. |
| 2020/0023648 A1 | 1/2020 | Gotou et al. |
| 2020/0115576 A1* | 4/2020 | Kodama .................. B41M 5/00 |
| 2021/0301156 A1 | 9/2021 | Hirade et al. |
| 2021/0363369 A1 | 11/2021 | Akima et al. |
| 2022/0024220 A1 | 1/2022 | Kudo et al. |

FOREIGN PATENT DOCUMENTS

| | | |
|---|---|---|
| JP | 2018-123235 | 8/2018 |
| JP | 2018-131581 | 8/2018 |
| JP | 2019-031611 | 2/2019 |
| WO | WO2017/109786 A1 | 6/2017 |

* cited by examiner

*Primary Examiner* — Lisa Solomon
(74) *Attorney, Agent, or Firm* — Grüneberg and Myers PLLC

(57) ABSTRACT

A printing method contains applying a processing fluid to a fabric and applying an ink to the fabric to which the processing fluid has been applied, wherein the ink contains a pigment, a resin having a cross-linkable functional group, a pH regulator, and at least one member selected from a block isocyanate compound, a carbodiimide compound, and a polymer having an oxazoline group.

31 Claims, 1 Drawing Sheet

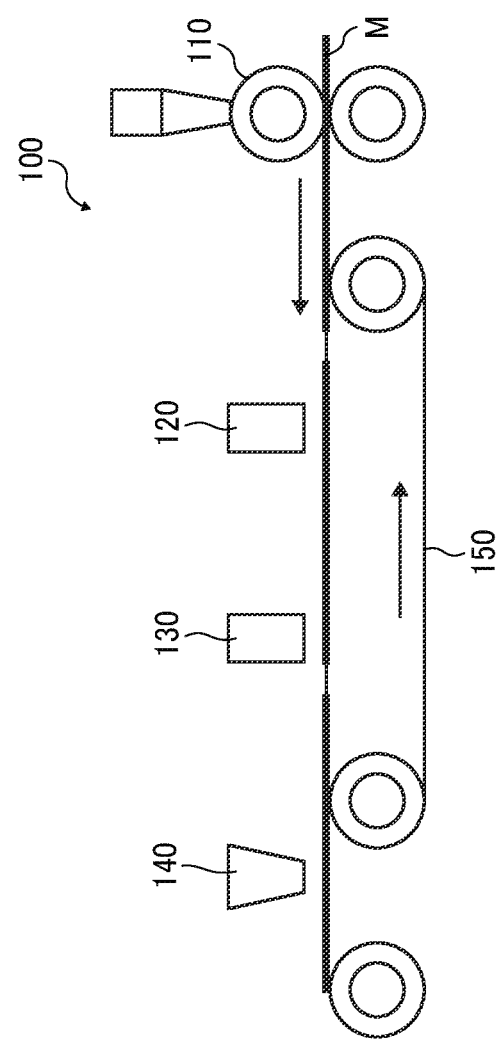

PRINTING METHOD, PRINTING DEVICE, PRINTED MATTER, AND SET OF PROCESSING FLUID AND INK

CROSS-REFERENCE TO RELATED APPLICATIONS

This patent application is based on and claims priority pursuant to 35 U.S.C. § 119 to Japanese Patent Application Nos. 2021-205057 and 2022-116239, filed on Dec. 17, 2021, and Jul. 21, 2022, respectively, in the Japan Patent Office, the entire disclosures of which are hereby incorporated by reference herein.

BACKGROUND

Technical Field

The present invention relates to a printing method. a printing device, printed matter, and a set of a processing fluid and an ink.

Description of the Related Art

The market of direct printing on fabrics including T-shirts, so called direct to garment (DTG), is expanding year by year in the dyeing business. On the rise of personal recommendation business in apparel business and the trend of the active collaboration with fine art appearing in the interior textile field, there is demand for inkjet printing capable of printing images on fabrics with excellent coloring and fastness.

Unlike screen printing and other common printings, inkjet printing for directly forming an image on fabrics with ink containing a pigment obviates the need for manufacturing, storing, and rinsing color plates. Moreover, inkjet printing is suitable for high-mix low-volume manufacturing, quickens delivery by dispensing with transfer, and demonstrates excellent light resistance. Printing with a pigment has been researched and developed for enhancing the coloring and fastness of printed matter. Clothes including T-shirts are, however, temporarily and forcibly extended and twisted during putting on and taking off clothes. These clothes are required to be free of twisting when the force is released. In such printing, white ink and color ink are normally printed in this sequence and the amount of white ink attached to fabrics is more than that of color ink. Therefore, white ink greatly affects the properties of printed matter in particular when dark color fabric is used.

SUMMARY

According to embodiments of the present disclosure, a printing method is provided which contains applying a processing fluid to a fabric and applying an ink to the fabric to which the processing fluid has been applied, wherein the ink contains a pigment, a resin having a cross-linkable functional group, a pH regulator, and at least one member selected from the group consisting of a block isocyanate compound, a carbodiimide compound, and a polymer having an oxazoline group.

As another aspect of embodiments of the present disclosure, a printing device is provided which includes a processing fluid applying device configured to apply a processing fluid to a fabric; and an ink applying device configured to apply an ink to the fabric to which the processing fluid has been applied, wherein the ink contains a pigment, a resin having a cross-linkable functional group, a pH regulator, and at least one member selected from the group consisting of a block isocyanate compound, a carbodiimide compound, and a polymer having an oxazoline group.

As another aspect of embodiments of the present disclosure, printed matter is provided which contains a fabric and a printed layer printed on the fabric by the printing method mentioned above.

As another aspect of embodiments of the present disclosure, a set is provided which contains a processing fluid for forming an image on a fabric and an ink containing a pigment, a resin having a cross-linkable functional group, a pH regulator, and at least one member selected from the group consisting of a block isocyanate compound, a carbodiimide compound, and a polymer having an oxazoline group.

BRIEF DESCRIPTION OF THE DRAWING

A more complete appreciation of the disclosure and many of the attendant advantages and features thereof can be readily obtained and understood from the following detailed description with reference to the accompanying drawing, wherein:

The FIGURE is a schematic diagram illustrating a printing device according to an embodiment of the present invention.

The accompanying drawing is intended to depict example embodiments of the present invention and should not be interpreted to limit the scope thereof. The accompanying drawing is not to be considered as drawn to scale unless explicitly noted.

DESCRIPTION OF THE EMBODIMENTS

The terminology used herein is for the purpose of describing particular embodiments only and is not intended to be limiting of the present invention. As used herein, the singular forms "a," "an," and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Embodiments of the present invention are described in detail below with reference to accompanying drawings. In describing embodiments illustrated in the drawings, specific terminology is employed for the sake of clarity. However, the disclosure of this patent specification is not intended to be limited to the specific terminology so selected, and it is to be understood that each specific element includes all technical equivalents that have a similar function, operate in a similar manner, and achieve a similar result.

For the sake of simplicity, the same reference number will be given to identical constituent elements such as parts and materials having the same functions and redundant descriptions thereof omitted unless otherwise stated.

According to the present disclosure, a printing method is provided by which printed matter having an excellent laundry fastness and flexibility is produced while printed portions of fabric are prevented from twisting.

Printing Method and Printing Device

The printing method of the present disclosure includes applying a processing fluid to colored fabric, applying an ink to the fabric to which the processing fluid has been applied, and other optional processes.

The ink for use in the present disclosure of the present disclosure contains a pigment, a resin having a cross-linkable functional group, a pH regulator, and at least one member selected from the group consisting of a block isocyanate compound, a carbodiimide compound, and a polymer having an oxazoline group.

The printing device of the present disclosure includes a processing fluid applying device for applying a processing fluid to fabric, an ink applying device for applying an ink to the fabric to which the processing fluid has been applied, and other optional devices.

The ink for use in the printing device of the present disclosure contains a pigment, a resin having a cross-linkable functional group, a pH regulator, and at least one member selected from the group consisting of a block isocyanate compound, a carbodiimide compound, and a polymer having an oxazoline group.

The printing method can be suitably conducted by the printing device of the present disclosure. The processing fluid application can be executed by a processing fluid applying device. The ink application can be executed by the ink applying device. The other optional processes can be executed by the other optional devices.

Typically, it is difficult to strike a balance between the storage stability of an ink containing a cross-linking agent and the laundry fastness and flexibility of the printed portion of fabric while preventing the fabric from twisting.

In the present disclosure, printed matter having an excellent laundry fastness and flexibility can be produced on fabric with the ink mentioned above while keeping printed portions on the fabric from twisting because of the pigment, the resin having a cross-linkable functional group, the pH regulator, and at least one member selected from the group consisting of a block isocyanate compound, a carbodiimide compound, and a polymer having an oxazoline group contained in the ink.

Processing Fluid Application and Processing Fluid Applying Device

The processing fluid application includes applying the processing fluid to fabric and is executed by a processing fluid applying device. The processing fluid is also referred to as pre-processing fluid or a pre-applying liquid.

Methods of applying a processing fluid are not particularly limited and can be suitably selected to suit to a particular application. Specific examples include, but are not limited to, inkjetting, gravure coating, gravure offset coating, bar coating, roll coating, spray coating, knife coating, air knife coating, comma coating, U comma coating, AKKU coating, smoothing coating, micro gravure coating, reverse roll coating, four or five roll coating, dip coating, curtain coating, slide coating, and die coating. Of these, inkjet coating and spray coating are preferable.

The amount of processing fluid attached to fabric is preferably from 0.5 to 11 mg/cm$^2$ and more preferably from 0.8 to 9 mg/cm$^2$. An amount of processing fluid attached of 0.5 mg/cm$^2$ or more moderately aggregates ink, thereby enhancing the image density. An amount of processing fluid attached of 11 mg/cm$^2$ or less minimizes a decrease in the image density and fastness because the amount prevents excessive agglomeration of ink which results in a narrow coverage of the surface of fabric. Wet-on-wet printing of processing fluid and ink is preferable, which enhances the image density and fastness.

Wet-on-wet printing means that ink is applied onto fabric where 50 percent by mass or more of processing fluid that has been applied to the fabric remains thereon and/or ink is applied to fabric at a surface temperature of the fabric of 32 degrees C. or lower within 90 seconds of an application of processing fluid.

Optionally, it is preferable to heat and dry the fabric to which processing fluid has been applied. The fabric is heated by a known heating device such as a roll heater, drum heater, and heated wind to dry the processing fluid applied to the fabric.

Processing Fluid

The processing fluid preferably contains a flocculant, humectant, and surfactant and more preferably wax and other components on a necessity basis.

Flocculant

A flocculant aggregates or thickens ink when it is brought into contact with the ink. Specifically, a flocculant includes a component for aggregating dispersible particles, typically anionic compounds, such as a coloring material or resin contained in ink. When ink contacts a region where the flocculant in processing fluid that has been applied, the ink agglomerates or becomes sticky. The coloring material in the ink stays on the surface of the fabric, which increases the image density of printed matter.

Examples of the flocculant include, but are not limited to, organic salts, inorganic salts, and cationic polymers. Of these, organic or inorganic salts are preferable for safety reason. Monovalenet organic or inorganic salts are preferable to enhance the laundry fastness of obtained printed matter. Di- or higher valent inorganic salts are preferable to enhance the image density. These can be used alone or in combination.

Specific examples of the inorganic salts include, but are not limited to, mono-valent inorganic salts including sodium chloride, potassium chloride, and potassium nitride, and di- or higher valent inorganic salts including calcium carbonate, calcium nitride, calcium chloride, calcium acetate, calcium sulfate, nickel chloride, barium sulfate, zinc sulfate, zinc carbonate, aluminum silicate, calcium silicate, magnesium silicate, aluminum hydroxide, aluminum sulfate, aluminum phosphate, aluminum lactate, polyaluminum chloride, ferric sulfate, potassium aluminum sulfate, potassium iron alum, and ammonium iron alum.

Specific examples of the organic salts include, but are not limited to, ammonium acetate, ammonium formate, ammonium oxalate, and ammonium lactate.

As the cationic polymer, quaternary ammonium salt type cationic polymers are preferable. Specific examples include, but are not limited to, polymers of dialkylaryl ammonium chloride, polymers of dialkyl aminoethyl (meth)acrylate quaternary ammonium salts, polymers of modified polyvinyl alcohol dialkyl ammonium salts, and polymers of dialkyl diallyl ammonium salts.

Specific examples of the other cationic polymers include, but are not limited to, cationic specially-modified polyamine compounds, cationic polyamide polyamine compounds, cationic urea-formarine resin compounds, cationic polyacrylic amide compounds, cationic alkyl ketene dimers, cationic dicyane diamide compounds, cationic dicyan diamide-formarine condensation compounds, cationic dicyan diamide-polyamine condensation compounds, cationic polyvinyl formamide compounds, cationic polyvinyl pyridine compounds, cationic polyalkylene polyamine compounds, and cationic epoxy polyamide compounds.

The proportion of the flocculant to the processing fluid is from 0.1 to 10 percent by mass and more preferably from 0.5 to 5 percent by mass to enhance the image density and reduce the occurrence of color bleed.

Humectant

The humectant mentioned above is not particularly limited and can be a water-soluble organic solvent. Examples of the water-soluble organic solvent include, but are not limited to, polyols, ethers such as polyol alkylethers and polyol arylethers, nitrogen-containing heterocyclic compounds, amides, amines, and sulfur-containing compounds.

Specific examples of the humectant include, but are not limited to: polyhydric alcohols such as ethylene glycol, diethylene glycol, 1,2-propanediol, 1,3-propanediol, 1,2-butanediol, 1,3-butanediol, 1,4-butanediol, 2,3-butanediol, 3-methyl-1,3-butane diol, triethylene glycol, polyethylene glycol, polypropylene glycol, 1,2-pentanediol, 1,3-pentanediol, 1,4-pentanediol, 2,4-pentanediol, 1,5-pentanediol, 1,2-hexanediol, 1,6-hexanediol, 1,3-hexanediol, 2,5-hexanediol, 1,5-hexanediol, triethylene glycol, 1,2,6-hexanetriol, 2-ethyl-1,3-hexanediol, ethyl-1,2,4-butane triol, 1,2,3-butanetriol, 2,2,4-trimethyl-1,3-pentanediol, and petriol; polyol alkyl ethers such as ethylene glycol monoethyl ether, ethylene glycol monobutyl ether, diethylene glycol monomethyl ether, diethylene glycol monoethyl ether, diethylene glycol monobutyl ether, tetraethylene glycol monomethyl ether, and propylene glycol monoethyl ether; polyol aryl ethers such as ethylene glycol monophenyl ether and ethylene glycol monobenzyl ether; nitrogen-containing heterocyclic compounds such as 2-pyrrolidone, N-methyl-2-pyrrolidone, N-hydroxyethyl-2-pyrrolidone, 1,3-dimethyl-2-imidazolidinone, ε-caprolactam, and γ-butyrolactone; amides such as formamide, N-methylformamide, N,N-dimethylformamide, 3-methoxy-N,N-dimethyl propioneamide, and 3-buthoxy-N,N-dimethyl propioneamide; amines such as monoethanolamine, diethanolamine, and triethylamine; sulfur-containing compounds such as dimethyl sulfoxide, sulfolane, and thiodiethanol; propylene carbonate, and ethylene carbonate.

The humectant is preferably a polyol compound having eight or more carbon atoms and a glycol ether compound. Specific examples of the polyol compound having eight or more carbon atoms include, but are not limited to, 2-ethyl-1,3-hexanediol and 2,2,4-trimethyl-1,3-pentanediol.

Specific examples of the glycolether compounds include, but are not limited to, polyhydric alcohol alkylethers such as ethylene glycol monoethylether, ethylene glycol monobutylether, diethylene glycol monomethylether, diethylene glycol monoethylether, diethylene glycol monobutylether, tetraethylene glycol monomethylether, and propylene glycol monoethylether and polyhydric alcohol arylethers such as ethylene glycol monophenylether and ethylene glycol monobenzylether.

The proportion of the humectant to the entire of a processing fluid is not particularly limited and can be suitably selected to suit a particular application. It is preferably from 5 to 60 percent by mass and more preferably from 10 to 50 percent by mass to enhance the drying property and discharging reliability of the fluid.

Surfactant

Silicone-based surfactants, fluorochemical surfactants, amphoteric surfactants, nonionic surfactants, and anionic surfactants can be used. Of these, a combinational use of a silicone-based surfactant with a lubricant is preferable to enhance the flexibility of printed matter. Unlike a lubricant, it is preferable to dissolve the surfactant mentioned above in processing fluid for use.

The silicone-based surfactant is not particularly limited and can be suitably selected to suit to a particular application. The silicone-based surfactant not decomposable even in a high pH environment is preferable.

Specific examples of the silicone-based surfactant include, but are not limited to, side-chain modified polydimethyl siloxane, both-terminal modified polydimethyl siloxane, one-terminal-modified polydimethyl siloxane, and side chain both-terminal modified polydimethyl siloxane. Silicone-based surfactants having a polyoxyethylene group or polyoxyethylene polyoxypropylene group as the modification group are particularly preferable because these demonstrate good properties as aqueous surfactants. The silicone-based surfactant can be a polyether-modified silicone-based surfactant. One of the surfactants is a compound in which a polyalkylene oxide structure is introduced into the side chain of the Si site of dimethyl siloxane.

Specific examples of the fluorochemical surfactant include, but are not limited to, perfluoroalkyl sulfonic acid compounds, perfluoroalkyl carboxylic acid compounds, ester compounds of perfluoroalkyl phosphoric acid, adducts of perfluoroalkyl ethylene oxide, and polyoxyalkylene ether polymer compounds having a perfluoroalkyl ether group in its side chain. These are particularly preferable because the fluorochemical surfactant does not readily produce foams.

Specific examples of the perfluoroalkyl sulfonic acid compounds include, but are not limited to, perfluoroalkyl sulfonic acid and salts of perfluoroalkyl sulfonic acid.

Specific examples of the perfluoroalkyl carbonic acid compounds include, but are not limited to, perfluoroalkyl carbonic acid and salts of perfluoroalkyl carbonic acid.

Specific examples of the polyoxyalkylene ether polymer compounds having a perfluoroalkyl ether group in its side chain include, but are not limited to, sulfuric acid ester salts of polyoxyalkylene ether polymer having a perfluoroalkyl ether group in its side chain, and salts of polyoxyalkylene ether polymers having a perfluoroalkyl ether group in its side chain. Counter ions of salts in these fluoro-surfactants are, for example, Li, Na, K, $NH_4$, $NH_3CH_2CH_2OH$, $NH_2(CH_2CH_2OH)_2$, and $NH(CH_2CH_2OH)_3$.

Specific examples of the amphoteric surfactants include, but are not limited to, lauryl aminopropionic acid salts, lauryl dimethyl betaine, stearyl dimethyl betaine, and lauryl dihydroxyethyl betaine.

Specific examples of the nonionic surfactants include, but are not limited to, polyoxyethylene alkyl phenyl ethers, polyoxyethylene alkyl esters, polyoxyethylene alkyl amines, polyoxyethylene alkyl amides, polyoxyethylene propylene block polymers, sorbitan aliphatic acid esters, polyoxyethylene sorbitan aliphatic acid esters, and adducts of acetylene alcohol with ethylene oxides.

Specific examples of the anionic surfactants include, but are not limited to, polyoxyethylene alkyl ether acetates, dodecyl benzene sulfonates, laurates, and polyoxyethylene alkyl ether sulfates.

The silicone-based surfactant is not particularly limited and can be suitably selected to suit to a particular application.

Examples include, but are not limited to, side-chain modified polydimethylsiloxane, both-terminal modified polydimethylsiloxane, one terminal-modified polydimethyl siloxane, and side chain both terminal-modified polydimethylsiloxane. Of these, polyether-modified silicon-based surfactants having a polyoxyethylene group or polyoxyethylene polyoxypropylene group as the modification group are particularly preferable because these demonstrate good properties as aqueous surfactants.

Such surfactants can be synthesized or procured. Products can be procured from BYK-Chemie GmbH, Shin-Etsu Silicone Co., Ltd., Dow Corning Toray Co., Ltd., NIHON EMULSION Co., Ltd., Kyoeisha Chemical Co., Ltd., and others.

The polyether-modified silicon-based surfactant has no particular limit and can be suitably selected to suit to a particular application. For example, a compound is usable in which the polyalkylene oxide structure represented by the following Chemical Formula S-1 is introduced into the side chain of the Si site of dimethyl polysiloxane.

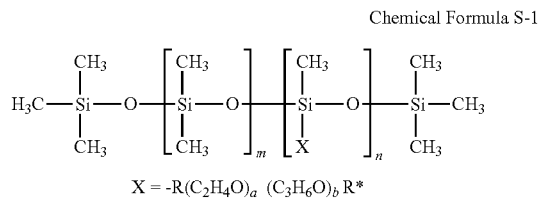

Chemical Formula S-1

$X = -R(C_2H_4O)_a (C_3H_6O)_b R^*$

In Chemical Formula S-1, m, n, a, and b each, respectively represent integers, R represents an alkylene group, and R' represents an alkyl group.

Specific examples of the polyether-modified silicone-based surfactant include, but are not limited to, KF-618, KF-642, and KF-643 (all manufactured by Shin-Etsu Chemical Co., Ltd.), EMALEX-SS-5602 and SS-1906EX (both manufactured by NIHON EMULSION Co., Ltd.), FZ-2105, FZ-2118, FZ-2154, FZ-2161, FZ-2162, FZ-2163, and FZ-2164 (all manufactured by Dow Corning Toray Co., Ltd.), BYK-33 and BYK-387 (both manufactured by BYK Chemie GmbH), and TSF4440, TSF4452, and TSF4453 (all manufactured by Toshiba Silicone Co. Ltd.).

As the fluorochemical surfactant, a compound in which the number of carbon atoms replaced with fluorine atoms is from 2 to 16 is preferable and, from 4 to 16, more preferable.

Specific examples of the fluorochemical surfactant include, but are not limited to, perfluoroalkyl phosphoric acid ester compounds, adducts of perfluoroalkyl with ethylene oxide, and polyoxyalkylene ether polymer compounds having a perfluoroalkyl ether group in its side chain.

Of these, polyoxyalkylene ether polymer compounds having a perfluoroalkyl ether group in its side chain are preferable because these do not readily foam and the fluorochemical surfactant represented by the following Chemical Formula F-1 or Chemical Formula F-2 is preferable.

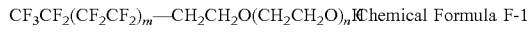

$CF_3CF_2(CF_2CF_2)_m$—$CH_2CH_2O(CH_2CH_2O)_n$H  Chemical Formula F-1

In the compound represented by Chemical Formula F-1, "m" is preferably 0 or an integer of from 1 to 10 and "n" is preferably 0 or an integer of from 1 to 40.

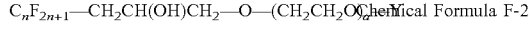

$C_nF_{2n+1}$—$CH_2CH(OH)CH_2$—$O$—$(CH_2CH_2O)_a$Y  Chemical Formula F-2

In the compound represented by the Chemical Formula F-2, Y represents H or $C_mF_{2m+1}$, where n represents an integer of from 1 to 6, or $CH_2CH(OH)CH_2$—$C_mF_{2m+1}$, where m represents an integer of from 4 to 6, or $C_pH_{2p+1}$, where p is an integer of from 1 to 19. "n" represents an integer of from 1 to 6. "a" represents an integer of from 4 to 14.

The fluorochemical surfactant can be procured.

Specific examples of the procurable products include, but are not limited to, SURFLON S-111, SURFLON S-112, SURFLON S-113, SURFLON S-121, SURFLON S-131, SURFLON S-132, SURFLON S-141, and SURFLON S-145 (all manufactured by ASAHI GLASS CO., LTD.); FLUORAD FC-93, FC-95, FC-98, FC-129, FC-135, FC-170C, FC-430, and FC-431 (all manufactured by Sumitomo 3M Limited); MEGAFACE F-470, F-1405, and F-474 (all manufactured by DIC CORPORATION); ZONYL™ TBS, FSP, FSA, FSN-100, FSN, FSO-100, FSO, FS-300, UR, CAPSTONE® FS-30, FS-31, FS-3100, FS-34, FS-35 (all manufactured by The Chemours Company); FT-110, FT-250, FT-251, FT-400S, FT-150, and FT-400SW (all manufactured by NEOS COMPANY LIMITED); POLYFOX PF-136A, PF-156A, PF-151N, PF-154, PF-159 (manufactured by OMNOVA SOLUTIONS INC.), and UNIDYNE DSN-403N (manufactured by DAIKIN INDUSTRIES). Of these, FS-3100, FS-34, and FS-300 (manufactured by The Chemours Company), FT-110, FT-250, FT-251, FT-400S, FT-150, and FT-400SW (manufactured by NEOS COMPANY LIMITED), PolyFox PF-151N (manufactured by OMNOVA SOLUTIONS INC.), and UNIDYNE DSN-403N (manufactured by DAIKIN INDUSTRIES) are particularly preferable in terms of good printing quality, in particular, coloring, and improvement on permeation to paper, wettability, and uniform dying property.

The proportion of the surfactant in a processing fluid is not particularly limited and it can be suitably selected to suit a particular application. It is preferably from 0.001 to 5 percent by mass and more preferably from 0.05 percent by mass to 5 percent by mass to achieve good wettability and discharging stability.

Wax

Wax enhances the concealing by white, fastness, and flexibility of printed matter as a component forming the printed matter. A processing fluid containing a wax enhances the concealing by white, fastness, and flexibility of printed matter formed by applying the processing fluid.

The wax is preferably an anionic or nonionic compound to minimize contamination inside a device attributable to mist produced during applying a processing fluid to fabric. Using a nonionic compound is more preferable to reduce the production of mist which increases when a processing fluid is discharged by inkjetting.

Particle wax is preferable as the wax and includes polyethylene oxide, carnauba wax, and a siloxane compound. Of these, siloxane compounds are preferable to enhance the concealing by white, fastness, and flexibility of printed matter.

The siloxane compound is not particularly limited and can be suitably used to suit a particular application.

Specific examples include, but are not limited to, organopolysiloxane such as dimethyl polysiloxane and modified organopolysiloxane such as polyether-modified organopolysiloxane, amino-modified organopolysiloxane, hydroxy-modified organopolysiloxane, epoxy-modified organopolysiloxane, and phenyl-modified organopolysiloxane. Of these, dimethyl polysiloxane or amino-modified organopolysiloxane is preferable to enhance the concealing by white, fastness, and flexibility of printed matter. These can be used alone or in combination.

Specific examples of the siloxane compounds include, but are not limited to, KM-860A, dimethyl polysiloxane, manufactured by Shin-Etsu Chemical Co., Ltd., KM-9737A, dimethyl polysiloxane, manufactured by Shin-Etsu Chemical Co., Ltd., KM-9782, dimethyl polysiloxane, manufactured by Shin-Etsu Chemical Co., Ltd., KM-862T, dimethyl polysiloxane, manufactured by Shin-Etsu Chemical Co., Ltd., KM-9738A, dimethyl polysiloxane, manufactured by Shin-Etsu Chemical Co., Ltd., POLON-MF-14, amino-modified organopolysiloxane, manufactured by Shin-Etsu Chemical Co., Ltd., POLON-MF-51, amino-modified organopolysiloxane, manufactured by Shin-Etsu Chemical Co., Ltd., X-51-1264, epoxy-modified organopolysiloxane, manufactured by Shin-Etsu Chemical Co., Ltd., KM-9739, phenyl-modified organopolysiloxane, manufactured by Shin-Etsu Chemical Co., Ltd., BYK-307, polyether-modified organopolysiloxane, manufactured by BYK-Chemie Japan, BYK-333, dimethyl polysiloxane, manufactured by BYK-Chemie Japan, and BYK-378, dimethyl polysiloxane, manufactured by BYK-Chemie Japan.

Polyethylene wax can be procured.

Specific examples include, but are not limited to, "Nopcoat" series, manufactured by SAN NOPCO LIMITED, "Nopcomal" series, manufactured by SAN NOPCO LIMITED, "Hitech" series, manufactured by TOHO Chemical Industry Company, Limited, and AQUACER series including AQUACER-515, manufactured by BYK Japan KK.

Carnauba wax can be procured.

Specific examples include, but are not limited to, Selosol 524 and Trasol CN, both manufactured by CHUKYO YUSHI CO., LTD.

The melting point of the wax is preferably from 50 to 130 degrees C. and more preferably from 60 to 120 degrees C. A melting point in the range specified above enhances the concealing by white, fastness, and flexibiilty of printed matter.

In a processing fluid, the wax is preferably dispersed in a form of lubricant particles.

If this wax form is stable in a processing fluid, the fluid's viscosity does not significantly fluctuate, thereby enhancing the storage stability and making it suitable to use such wax for inkjetting, which is readily affected by a fluctuation of viscosity. The wax can be liquid or solid.

The volume average particle diameter of wax is not particularly limited and can be suitably selected to suit to a particular application. It is preferably from 0.01 μm or greater and more preferably from 0.01 to 0.2 μm. A volume average particle diameter of 0.01 μm or greater enhances the flexibility of printed matter. The volume average particle diameter can be measured by using an instrument such as a particle size analyzer, Nanotrac Wave-UT151, manufactured by MicrotracBEL Corp.

The proportion of wax to the entire of processing fluid is preferably from 0.1 to 10 percent by mass and more preferably from 0.1 to 6 percent by mass. A proportion of 0.1 percent by mass or greater further enhances the flexibility of printed matter. A proportion of 10 percent by mass or less enhances the laundry fastness of printed matter.

Water

As water, pure water and hyper pure water such as deionized water, ultrafiltered water, reverse osmosis water, and distilled water can be used.

The proportion of the processing fluid is not particularly limited and can be suitably selected to suit to a particular application. The proportion of water in a processing fluid is preferably from 10 to 90 percent by mass, more preferably from 30 to 90 percent by mass, and furthermore preferably from 50 to 90 percent by mass in terms of the drying property and discharging reliability of the processing fluid.

Other Components

As the other components, known additives can be used, including foam inhibitors or defoaming agents, pH regulators, preservatives and fungicides, and corrosion inhibitors.

Defoaming Agent

The defoaming agent has no particular limit. Examples include, but are not limited to silicon-based defoaming agents, polyether-based defoaming agents, and aliphatic acid ester-based defoaming agents. These can be used alone or in combination. Of these, silicone-based defoaming agents are preferable to enhance the ability of braking foams.

Preservatives and Fungicides

The preservatives and fungicides are not particularly limited. One specific example is 1,2-benzisothiazoline-3-one.

Corrosion Inhibitor

The corrosion inhibitor has no particular limit.

Specific examples include, but are not limited to, acid sulfites and sodium thiosulfates.

pH Regulator

The pH regulator has no particular limit as long as it can control pH to 7 or greater. It includes, but are not limited to, amines such as diethanol amine and triethanol amine.

The processing fluid can be prepared by mixing and stirring a flocculant, humectant, surfactant, wax, water, and other optional components. A stirrer using a normal stirring blade, a magnetic stirrer, a high performance disperser can be used for mixing and stirring.

Property of Processing Fluid

Properties of the processing fluid are not particularly limited and can be suitably selected to suit to a particular application. For example, the viscosity, surface tension, and pH are preferable in the following ranges.

The viscosity of the processing fluid at 25 degrees C. is preferably from 5 to 30 mPa·s and more preferably from 5 to 25 mPa·s to achieve good dischargeability. Viscosity can be measured by an instrument such as a rotatory viscometer (RE-80L, manufactured by TOKI SANGYO CO., LTD.). The measuring conditions are as follows:

Standard cone rotor (1° 34'×R24)
Sample liquid amount: 1.2 mL
Rate of rotations: 50 rotations per minute (rpm)
25 degrees C.
Measuring time: three minutes.

The surface tension of a processing fluid is preferably 35 mN/m or less and more preferably 32 mN/m or less at 25 degrees C. to suitably level the fluid on the fabric and quickly dry the fabric.

pH of the processing fluid is preferably from 4 to 7 and more preferably from 4.5 to 6 to achieve good agglomeration and prevent corrosion of metal material brought into contact with liquid.

Ink Application and Ink Applying Device

In the ink application, an ink is applied onto fabric to which a processing fluid has been applied with an ink application device.

In the present disclosure, the ink is applied after the processing fluid is applied to fabric. The ink may be applied before or after the processing fluid is dried. The ink is preferably applied after the fluid is dried.

The way of applying the ink mentioned above is not particularly limited. Specific examples include, but are not limited to, blade coating, gravure coating, gravure offset coating, bar coating, roll coating, knife coating, air knife coating, comma coating, U comma coating, AKKU coating, smoothing coating, micro gravure coating, reverse roll coating, four roll coating. five roll coating, dip coating, curtain coating, slide coating, and die coating. Of these, inkjetting is preferable in terms of the maintenance of a device and the operation efficiency.

Ink

The ink contains a pigment, a resin having a cross-linkable functional group, a pH regulator, and at least one member selected from the group consisting of a block isocyanate compound, a carbodiimide compound, and a polymer having an oxazoline group.

Since the details such as types and proportions of water, the organic solvent, surfactant, and other components in the ink are the same as those of the processing fluid, their descriptions are omitted.

At least one of pigments and resins is preferably an anionic compound in accordance with the processing fluid containing a flocculant, which is preferably a cationic compound. If at least one of pigments and resins is an anionic compound, an ink agglomerates or becomes sticky when it contacts the component, flocculant, contained in a processing fluid. The pigment therefore stays on the surface of fabric, which leads to enhancing the image density.

Resin Having Cross-Linkable Functional Group

The type of the resin having a cross-linkable functional group is not particularly limited and can be suitably selected to suit to a particular application. Examples include, but are not limited to, urethane resins, polyester resins, acrylic-based resins, vinyl acetate-based resins, styrene-based resins, butadiene-based resins, styrene-butadiene-based resins, vinylchloride-based resins, acrylic styrene-based resins, and acrylic silicone-based resins. Of these, urethane resins are preferable to enhance the image fastness and flexibility. In addition, anionic resins are preferable considering the combinational use with a flocculant as described above.

Specific examples of the cross-linkable group include, but are not limited to, an isocyanate group and silanol group. Using a chemically protected, i.e., blocked or capped isocyanate group is preferable. A blocked isocyanate group becomes unprotected by heating and activated, resulting in forming a bond such as a urethane bond, urea bond, and allophanate bond.

In a urethane resin having a cross-linkable group, the cross-linkable group is preferably three or more in a molecule, in which the cross-linkable group is allowed to form a cross-linking structure. The urethane resin has a bond such as a urethane bond, urea bond, and allophanate bond formed from reaction between an isocyanate group and a reactive group such as a hydroxyl group, amino group, urethane bond group, and carboxyl group.

The form of a resin in ink is not particularly limited. Resin particles are preferable. It is possible to obtain an ink by mixing a resin emulsion in which such resin particles are dispersed in water as a dispersion medium with materials such as a coloring material and an organic solvent. The resin particle can be synthesized or procured.

The volume average particle diameter (mean volume diameter) of the resin particle is not particularly limited and can be suitably selected to suit to a particular application. The mean volume diameter is preferably from 10 to 1,000 nm, more preferably from 10 to 200 nm, and furthermore preferably from 10 to 100 nm to achieve good fixability and image fastness.

The volume average particle diameter can be measured by using an instrument such as a particle size analyzer (Nanotrac Wave-UT151, manufactured by MicrotracBEL Corp.).

The proportion of the resin is not particularly limited and can be suitably selected to suit to a particular application. It is preferably from 1 to 30 percent by mass and more preferably from 5 to 20 percent by mass to the entire of ink in terms of the fixability and storage stability of the ink.

Block Isocyanate Compound, Carbodiimide Compound, or Polymer Having Oxazoline Group Of at least one member selected from the group consisting of a block isocyanate compound, a carbodiimide compound, and a polymer having an oxazoline group, the polymer having an oxazoline group is preferable.

At least one member selected from the group consisting of a block isocyanate compound, a carbodiimide compound, and a polymer having an oxazoline group enhances the laundry fastness of printed matter and reduces twisting of fabric by cross-linking between resin particles and via the dispersant of a pigment dispersion.

In a polymer having an oxazoline group, the oxazoline group is allowed to react with a carboxyl group in a resin particle or dispersant of a pigment dispersion. The reaction with a carboxyl group proceeds at room temperature. By a combinational use with a pH regulator, which is described later, the reaction portion is blocked, resulting in a good storage stability in ink. The cross-linking reaction proceeds by heating during ink fixing. Specific examples of the polymer having an oxazoline group include, but are not limited to, emulsion Type K-2010E, K-2020E, K-2030E, K-2035E, water-soluble type WS-300, WS-500, and WS-700, all manufactured by NIPPON SHOKUBAI CO., LTD. The emulsion type is preferable in terms of ink viscosity, dischargeability, and storage stability. These can be used alone or in combination.

The carbodiimide compound is a cross-linking agent allowed to react with a carboxylic acid.

Specific examples of the carbodiimide compound include, but are not limited to, CARBODILITE E-02 and E-03A, manufactured by Nisshinbo Chemical Inc.

The active isocyanate group is blocked in a block isocyanate compound by a blocking agent. It is therefore stable in a normal state. However, the block agent is isolated by heating treatment, thereby reviving the active isocyanate group, causing cross-linking reaction. Specific examples of the block isocyanate compound include, but are not limited to, Takenate$^{registered}$ WB-3021, manufactured by Mitsui Chemicals, Inc., ELASTRON BN-77, 69, and 11, all manufactured by DKS Co., Ltd., SU-268A, NBP-8730, and NBP-211, manufactured by Meisei Chemical Works, Ltd. These can be used alone or in combination.

The proportion of the at least one member selected from the group consisting of a block isocyanate compound, a carbodiimide compound, and a polymer having an oxazoline group, the polymer having an oxazoline group is preferably from 0.3 to 1.5 percent by mass. The proportion of 0.3 percent by mass or greater allows cross-linking reaction to proceed during ink fixing, thereby enhancing the image robustness and reducing twisting of printed matter. A proportion of 1.5 percent by mass or less inhibits the cross-linking reaction in ink so that the ink storage stability does not deteriorate.

pH Regulator

The pH regulator adjusts the pH to 7 or greater and are preferably amine compounds having 4 to 8 carbon atoms.

Specific examples include, but are not limited to, 2-amino-2-ethyl-1,3-propane diol, 2-amino-2-methyl-1,3-propane diol, diethanol amine, triethanol amine, and triethyl amine.

The oxazoline group in the polymer having an oxazoline group as a cross-linking agent for use in the present disclosure is likely to react with a carboxylic group contained in a dispersant of a water-dispersible resin particle or pigment dispersion as described above. However, an oxazoline group does not usually react with a carboxylic acid salt. Due to this reaction profile of an oxazoline, in an ink containing a pH regulator, a carboxylic group forms a carboxylic acid salt by the neutralization effect of the pH regulator, which blocks cross-linking, thereby enhancing the ink storage stability. Of these pH regulators, 2-amino-2-ethyl-1,3-propane diol is preferable because it is not likely to evaporate in a storage environment, which leads to a good ink storage stability.

Polyol Compound or Glycolether Compound Having 8 to 11 Carbon Atoms

It is preferable to contain a polyol compound having 8 to 11 carbon atoms and/or a glycol ether compound having 8 to 11 carbon atoms as a permeating agent.

The polyol compound having 8 to 11 carbon atoms is preferably a non-wetting polyol compound.

"Non-wetting agent" means having a solubility of from 0.2 to 5 percent by mass in water at 25 degrees C.

Of these permeating agents, 1,3-diol compounds represented by the following Chemical Formula A is preferable. Of these, 2-ethyl-1,3-hexanediol (solubility of 4.2 percent at 25 degrees C.) and 2,2,4-trimethyl-1,3-pentane diol (solubility of 2.0 percent at 25 degrees C.) are preferable and 2-ethyl-1,3-hexanediol is particularly preferable.

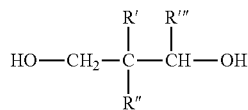

Chemical Formula A

In Chemical Formula A, R' represents a methyl group or an ethyl group, R" represents a hydrogen atom or a methyl group, and R'" represents an ethyl group or a propyl group.

Specific examples of the other polyol compounds include, but are not limited to, aliphatic diols such as 2-ethyl-2-methyl-1,3-propanediol, 3,3-dimethyl-1,2-butane diol, 2,2-diethyl-1,3-propane diol, 2-methyl-2-propyl-1,3-propane diol, 2,4-dimethyl-2,4-pentane diol, 2,5-dimethyl-2,5-hexanediol, and 5-hexene-1,2-diol.

The proportion of a polyol compound having 8 to 11 carbon atoms and/or a glycol ether compound is from 0.5 to 2 percent by mass to the entire of an ink.

A proportion of 0.5 percent by mass or greater enhances permeation of ink, thereby enhancing the image fastness. In addition, if the proportion is not greater than 2 percent by mass, the ink is sufficiently dissolved so that the ink does not separate or initially become sticky or the image density does not decrease.

Pigment

As described above, the pigment mentioned above is preferably an anionic substance to work with a flocculant. Anionic pigments are more preferable.

As the pigment, titanium oxide having a secondary particle diameter of from 200 to 300 nm is preferable to achieve a good concealing property by white on fabric. Examples of the other pigments include, but are not limited to, black pigments, yellow pigments, magenta pigments, cyan pigments, white pigments, green pigments, orange pigments, and gloss or metallic pigments of gold, silver, and others.

Carbon black manufactured by known methods such as contact methods, furnace methods, and thermal methods can be used as an inorganic pigment in addition to iron oxide, calcium carbonate, barium sulfate, aluminum hydroxide, barium yellow, cadmium red, and chrome yellow.

Specific examples of the organic pigments include, but are not limited to, azo pigments, polycyclic pigments (e.g., phthalocyanine pigments, perylene pigments, perinone pigments, anthraquinone pigments, quinacridone pigments, dioxazine pigments, indigo pigments, thioindigo pigments, isoindolinone pigments, and quinophthalone pigments), dye chelates (e.g., basic dye type chelates and acid dye type chelates), nitro pigments, nitroso pigments, and aniline black. Of these pigments, pigments having good affinity with solvents are preferable. Hollow resin particles and hollow inorganic particles can also be used.

Specific examples of the pigments for black include, but are not limited to, carbon black (C.I. Pigment Black 7) such as furnace black, lamp black, acetylene black, and channel black, metals such as copper, iron (C.I. Pigment Black 11), and titanium oxide, and organic pigments such as aniline black (C.I. Pigment Black 1).

Specific examples of the pigments for color include, but are not limited to, C.I. Pigment Yellow 1, 3, 12, 13, 14, 17, 24, 34, 35, 37, 42 (yellow iron oxide), 53, 55, 74, 81, 83, 95, 97, 98, 100, 101, 104, 108, 109, 110, 117, 120, 138, 150, 153, 155, 180, 185, and 213; C.I. Pigment Orange 5, 13, 16, 17, 36, 43, and 51; C.I. Pigment Red 1, 2, 3, 5, 17, 22, 23, 31, 38, 48:2 {Permanent Red 2B(Ca)}, 48:3, 48:4, 49:1, 52:2, 53:1, 57:1 (Brilliant Carmine 6B), 60:1, 63:1, 63:2, 64:1, 81, 83, 88, 101 (rouge), 104, 105, 106, 108 (Cadmium Red), 112, 114, 122 (Quinacridone Magenta), 123, 146, 149, 166, 168, 170, 172, 177, 178, 179, 184, 185, 190, 193, 202, 207, 208, 209, 213, 219, 224, 254, and 264; C.I. Pigment Violet 1 (Rohdamine Lake), 3, 5:1, 16, 19, 23, and 38; C.I. Pigment Blue 1, 2, 15 (Phthalocyanine Blue), 15:1, 15:2, 15:3, 15:4, (Phthalocyanine Blue), 16, 17:1, 56, 60, and 63; C.I. Pigment Green 1, 4, 7, 8, 10, 17, 18, and 36.

The proportion of the coloring material to the entire of an ink can be suitably determined to suit to a particular application of the ink. It is preferably from 0.1 to 15 percent by mass and more preferably from 1 to 12 percent by mass.

Pigment ink dispersion is obtained by, for example, preparing a self-dispersible pigment by introducing a hydrophilic functional group into a pigment, coating the surface of a pigment with a resin followed by dispersion, or using a dispersant for dispersing a pigment.

One way of preparing a self-dispersible pigment by introducing a hydrophilic functional group into a pigment is to add a functional group such as a sulfone group and carboxyl group to a pigment (e.g., carbon) to disperse the pigment in water.

One way of dispersing a pigment by coating the surface of the pigment with resin is to encapsulate pigment particles in microcapsules for dispersion in water. This microcapsulated pigment is also referred to as a resin-coated pigment. In this case, all the pigments added are not necessarily entirely coated with a resin. The pigments may be not coated with a resin or partially coated with a resin.

One way of using a dispersant for dispersing a pigment is to use a known dispersant of a small or large molecular weight, typically a surfactant. As the dispersant, an anionic surfactant, a cationic surfactant, a nonionic surfactant, an amphoteric surfactant, or others can be selected depending on a pigment. Also, a nonionic surfactant (RT-100, manufactured by TAKEMOTO OIL & FAT CO., LTD.) and a formalin condensate of naphthalene sodium sulfonate are suitably used as the dispersant. Those can be used alone or in combination.

Other Optional Components

The other optional components are not particularly limited and can be suitably selected to suit to a particular application. Examples include, but are not limited to, defoaming agents, preservatives and fungicides, pH regulators, and corrosion inhibitors.

The properties of ink are not particularly limited and can be suitably selected to suit to a particular application. For example, viscosity, surface tension, and pH are preferably in the following ranges.

The ink preferably has a viscosity of from 5 to 30 mPa·s and more preferably from 5 to 25 mPa·s at 25 degrees C. to enhance the print density and text quality and achieve a good dischargeability.

Viscosity can be measured by an instrument such as a rotatory viscometer (RE-80L, manufactured by TOKI SANGYO CO., LTD.). The measuring conditions are as follows:

Standard cone rotor (1° 34'×R24)
Sample liquid amount: 1.2 mL
Rate of rotations: 50 rotations per minute (rpm)
25 degrees C.
Measuring time: three minutes.

The surface tension of ink is preferably 35 mN/m or less and more preferably 32 mN/m or less at 25 degrees C. because the ink suitably levels on a recording medium and the ink dries in a short time.

pH of the ink is preferably from 7 to 12 and more preferably from 8 to 11 to prevent corrosion of metal material in contact with liquid.

Set of Processing Fluid and Ink

A set of processing fluid and ink of the present disclosure contains a processing fluid and an ink containing a pigment, a resin having a cross-linkable functional group, a pH regulator, and at least one member selected from the group consisting of a block isocyanate compound, a carbodiimide compound, and a polymer having an oxazoline group.

The pigment, the resin having a cross-linkable functional group, a pH regulator, and the at least one member selected from the group consisting of a block isocyanate compound, a carbodiimide compound, and a polymer having an oxazoline group in the ink of the set of the processing fluid and ink of the present disclosure can be the same as those in the ink of the printing method of the present disclosure.

The processing fluid in the set of the processing fluid can be the same as that of the processing fluid of the printing method of the present disclosure.

Method of Detecting Substance Contained

The quantitative analysis and qualitative analysis for the organic solvents, resin, coloring materials, and other components contained in ink and processing fluid are conducted by a method such as gas chromatography mass spectrometry (GC-MS). One of the measuring devices of GC-MS is GCMS-QP 2020NX, manufactured by Shimadzu Corporation. Water contained in the ink and the processing fluid can be measured by a known method such as quantitative analysis of the volatile components by GC-MS or mass variation by thermogravimeter-differential thermal analysis (TG-DTA).

Fabric

Fabric is a subject to which the processing fluid and the ink mentioned above are applied, thereby forming printed matter. "Fabric" in the present disclosure means a substance like textile, knitted work, and non-woven fabric, manufactured from fiber. The fiber is preferably organic fiber including synthetic fiber, semi-synthetic fiber, regenerated fiber, and natural fiber.

Specific examples of synthetic fiber include, but are not limited to, polyester, polyamide, acrylic, polyolefin, polyvinyl alcohol, polyvinyl chloride, polyurethane, and polyimide. Specific examples of semi-synthetic fiber include, but are not limited to, acetate, diaceate, and triacetate. Specific examples of regenerated fiber include, but are not limited to, polynosic, rayon, lyocell, and cupra.

Specific examples of natural fiber include, but are not limited to, cotton, hemp, silk, and wool.

Biodegradable polyester compositions can be also used. Biodegradable polyester compositions contain a substance such as biodegradable aliphatic-aromatic polyester or polylactic acid and an optional substance including an organic or inorganic filler.

Specific examples of biodegradable aliphatic-aromatic polyester include, but are not limited to, polybutylene adipate terephthalate (PBAT), polybutylene succinate terephthalate (PBST), and polybutylene sebacate terephthalate (PBSeT).

Organic filler includes natural starch, plasticized starch, modified starch, natural fiber, and wood flour.

Inorganic filler includes talc flour, montmorillonite, kaolin, chalk, calcium carbonate, graphite, plaster, conductive carbon black, calcium chloride, iron oxide, dolomite, silica, walloasonite, titanium dioxide, silicate, mica, glass fiber, and mineral fiber.

Specific examples of the fabric include, but are not limited to, shirts, T-shirts, sweatshirts, handkerchieves, towel, Noren (traditional Japanese fabric dividers or curtain, hung between rooms, on walls, in doorway, or in windows), and tote bags The images formed on fabric can be text, pictures, photos, a combination of text and pictures, a combination of text and photos, and any other images.

Dark color fabric is colored other than white, such as black, red, and blue.

"Dark color fabric" in the present disclosure preferably satisfies the following relationships: preferably 60>$L^*$, more preferably 50>$L^*$, furthermore preferably 40>$L^*$, and particularly preferably 30>$L^*$, and more particularly preferably 20>$L^*$ when the luminosity ($L^*$) of the fabric is measured by a spectrophotometer, e.g., X-rite exact, manufactured by X-Rite Inc.

Printing Device and Printing Method

The ink for use in the present disclosure can be suitably applied to various printing devices employing an inkjet printing method, such as printers, facsimile machines, photocopiers, multifunction peripherals (serving as a printer, a facsimile machine, and a photocopier), and solid freeform fabrication devices (3D printers, additive manufacturing devices).

In the present disclosure, the printing device and the printing method respectively represent a device capable of discharging fluid such as ink and processing fluids to a printing medium and a method of conducting printing utilizing the device. The printing medium refers to an item to which ink or processing fluids can be temporarily or permanently attached.

The printing device may furthermore optionally include a device relating to feeding, conveying, and ejecting a printing medium and other devices referred to as a pre-processing device and a post-processing device in addition to the head portion for discharging an ink.

The printing device and the printing method may furthermore optionally include a heating device (heater) for use in the heating and a drying device (drier) for use in the drying. For example, the heating device and the drying device heat and dry the print surface and the opposite surface of a printing medium. The heating device and the drying device are not particularly limited. For example, a fan heater, an infra-red heater, and a heat press can be used. It is possible to heat and dry a substrate before, during, and after printing.

In addition, the printing device and the printing method are not limited to those that produce meaningful visible images such as text and figures with the ink. They include a printing method and a printing device capable of producing patterns like geometric design and 3D images.

In addition, the printing device includes both a serial type device in which the liquid discharging head moves and a line type device in which the liquid discharging head is not moved, unless otherwise specified.

Furthermore, other than a desktop type printer, this printing device includes a device capable of printing images on a wide printing medium having, for example, A0 size, and a continuous printer capable of using continuous paper reeled in a roll-like form as a printing medium.

This printing device may include not only a portion for discharging ink but also a device referred to as a pre-processing device and a post-processing device.

As an example of the pre-processing device and the post-processing device, as in the case of the ink such as black (K), cyan (C), magenta (M), yellow (Y), and white (W), the pre-processing device and the post-processing device may further include a liquid accommodating unit including a pre-processing fluid and/or a post-processing fluid and a liquid discharging head for discharging the pre-processing fluid and/or the post-processing fluid according to an inkjet printing method.

As another example of the pre-processing device and the post-processing device, it is possible to dispose a pre-processing device and a post-processing device which do not employ an inkjet printing method but a blade coating method, a roll coating method, or a spray coating method.

The FIGURE is a diagram illustrating an example of the printing device.

In the printing method of the present disclosure, it is possible to apply the ink and the pre-processing fluid with a single printing device or separate printing devices.

A printer 100 illustrated in the FIGURE includes a pre-processing fluid applying unit 110, an ink applying unit 120, a post-processing fluid applying unit 130, a drying unit 140, and a conveyance unit 150. The pre-processing fluid applying unit 110 applies pre-processing fluid to a printing medium M.

The pre-processing fluid applying unit 110, the post-processing fluid applying unit 130, the drying unit 140, and the conveyance unit 150 can be omitted.

Methods of applying pre-processing fluid are not particularly limited. Specific examples include, but are not limited to, inkjetting, roller coating, gravure coating, gravure offset coating, bar coating, roll coating, knife coating, air knife coating, comma coating, U comma coating, AKKU coating, smoothing coating, micro gravure coating, reverse roll coating, four or five roll coating, dip coating, curtain coating, slide coating, and die coating.

The pre-processing fluid applying unit 110 can be omitted since printing can be conducted by a printing device after manually applying pre-processing fluid to a printing medium by a method such as bar coating.

The printing medium M for use in printing is not particularly limited.

Specific examples include, but are not limited to, plain paper, glossy paper, special paper, cloth, film, transparent sheets, and printing paper for general purposes.

The ink applying unit 120 applies inkjet ink to the surface of the printing medium M where the pre-processing fluid has been applied.

The ink applying unit 120 can be any known inkjet head.

The ink applying unit 120 can be a head for discharging ink of any color. Heads for discharging ink of color like Y (yellow), M (magenta), C (cyan), K (black), and W (white) can be optionally disposed.

The post-processing fluid applying unit 130 applies post-processing fluid to a region of the surface of the printing medium M where the inkjet ink has been applied.

The post-processing fluid applying unit 130 can be a spray or a roller in addition to an inkjet head.

The post-processing fluid applying unit 130 can be omitted.

The way of applying post-processing fluid is not particularly limited.

Specific examples include, but are not limited to, inkjetting, roller coating, blade coating, gravure coating, gravure offset coating, bar coating, roll coating, knife coating, air knife coating, comma coating, U comma coating, AKKU coating, smoothing coating, micro gravure coating, reverse roll coating, four or five roll coating, dip coating, curtain coating, slide coating, and die coating.

The drying unit 140 dries the printing medium M where the post-processing fluid is already applied. Without a post-processing fluid applying unit, the drying unit 140 can be omitted.

The drying unit 140 can use heated wind, infra red, microwave, a roll heater, and a heat press for heating and drying the printing medium M onto which the post-processing fluid is already applied. It is also possible to naturally dry the printing medium M onto which the post-processing fluid is already applied without operating the drying unit 140.

The conveyance unit 150 conveys the printing medium M.

There is no specific limit to the conveyance unit 150 as long as it can convey the printing medium M. The conveyance unit 150 can be a conveyance belt or a platen.

The printing device 100 may furthermore include a fixing unit for heat-fixing an image formed on the printing medium M. The fixing unit is not particularly limited. The fixing unit can be a fixing roller or a heat press.

As a desktop printer, the printer may further include a liquid accommodating unit containing a pre-processing fluid and/or a post-processing fluid and a liquid discharging head for discharging the pre-processing fluid and/or the post-processing fluid as one way of the pre-processing fluid applying device and the post-pre-processing fluid applying device to inkjet the pre-processing fluid and/or the post-processing fluid as in the case of the ink such as black (K), cyan (C), magenta (M), yellow (Y), and white (W).

Notably, ink and processing fluid are applicable not only by inkjetting but also by other methods.

Specific examples of such methods other than inkjetting include, but are not limited to, blade coating methods, gravure coating methods, bar coating methods, roll coating methods, dip coating methods, curtain coating methods, slide coating methods, die coating methods, and spray coating methods.

The usage of the ink and processing fluid for use in the present disclosure is not particularly limited and can be suitably selected to suit to a particular application. For example, they can be used for printed matter, a paint, a coating material, and foundation. The ink can be used to produce two-dimensional text and images and furthermore used as a material for solid fabrication for manufacturing a three-dimensional image (or solid freeform fabrication object).

The device for manufacturing a solid freeform fabrication object can be any known device with no particular limit. For example, the device includes a container, supplying device, discharging device, drier of ink, and others. The solid freeform fabrication object includes an object manufactured by repetitively coating ink. In addition, the solid freeform fabrication object includes a mold-processed product manufactured by processing a structure having a substrate such as a printing medium to which the ink is applied. The mold-processed product is manufactured from recorded matter or a structure having a sheet-like form and film-like form by, for example, heating drawing or punching. The mold-processed product is suitably used to produce items surface-decorated after molding such as gauges or operation panels of vehicles, office machines, electric and electronic devices, and cameras.

Terms such as image forming, recording, printing, and print used in the present disclosure represent the same meaning.

Also, recording media, media, and (print) substrates in the present disclosure have the same meaning unless otherwise specified.

The terms of image forming, recording, and printing in the present disclosure represent the same meaning.

Also, recording media, media, and print substrates in the present disclosure have the same meaning unless otherwise specified.

Having generally described preferred embodiments of this disclosure, further understanding can be obtained by reference to certain specific examples which are provided herein for the purpose of illustration only and are not intended to be limiting. In the descriptions in the following examples, the numbers represent weight ratios in parts, unless otherwise specified.

EXAMPLES

Next, the present disclosure is described in detail with reference to Examples but is not limited thereto.

Manufacturing Examples 1 to 5 of Processing Fluid

Preparation of Processing Fluids 1 to 5

Processing fluids were prepared according to a typical method based on the prescriptions and proportions shown in Table 1, followed by a membrane filter of cellulose acetate film having an average pore diameter of 1.2 to obtain processing fluids 1 to 5. The amounts of the compositions in Table 1 are represented in percent by mass.

TABLE 1

| | | Processing fluid No. | | | | |
|---|---|---|---|---|---|---|
| | | 1 | 2 | 3 | 4 | 5 |
| Flocculant | Ammonium lactate | | | | 20.0 | 20.0 |
| | Calcium nitrate tetrahydrate | 20.0 | 20.0 | 20.0 | | |
| Humectant | Propylene glycol | 30.0 | 30.0 | 30.0 | 30.0 | 30.0 |
| Wax | Oxidized polyethylene AQUACURE 515 | 2.0 | | | 2.0 | |
| | Carnauba wax Selosol 524 | | 2.0 | | | |
| | Siloxane compound KM9782 | | | 2.0 | | |
| Surfactant | SAG-503A | 0.1 | 0.1 | 0.1 | 0.1 | 0.1 |
| Defoaming agent | AD01 | 0.3 | 0.3 | 0.3 | 0.3 | 0.3 |
| Water | Pure water | Balance | Balance | Balance | Balance | Balance |
| Total (percent by mass) | | 100.0 | 100.0 | 100.0 | 100.0 | 100.0 |

The individual components shown in Table 1 are detailed as follows.

Wax

AQUACER 513: nonionic polyethylene oxide wax having a dispersion particle diameter of 150 nm, manufactured by Mitsui Chemicals, Inc.

Selosol 524: nonionic carnauba wax having a dispersion particle diameter of 200 nm, manufactured by CHUKYO YUSHI CO., LTD.

KM-9782: nonionic epoxy-siloxane compound having a dispersion particle diameter of 200 nm, manufactured by Shin-Etsu Chemical Co., Ltd.

Surfactant

SAG-503A: silicone-based surfactant, manufactured by Nissin Chemical co., ltd.

Defoaming Agent

AD01: EnviroGem AD01, manufactured by Air Products & Chemicals Inc.

Manufacturing Example 6 of Processing Fluid

Pre-processing fluid 6 having the following prescription was prepared.

Acetic acid: 1.9 percent by mass

Polyethylene wax oxide (CAS No. 68441-17-8)+cationic surfactant (*1 solid component containing a solid portion of 0.55 percent by mass in the final composition): 2 percent by mass Surfynol 104: 0.2 percent by mass Deionized water: balance (100 percent by mass in total)

pH was adjusted to pH 2.5 to 4 by sodium acetate.

*1: stock of wax colloid is as follows (proportion is represented in percent by mass of the entire of stock of wax colloid).

CERAFLOUR$^{trademark}$ 950 wax particle having a melting point of 145 degrees C.: 35 percent by mass Tego Dispertrademark 750: surfactant: 15 percent by mass Deionized water: 50 percent by mass Manufacturing Example 7 of Processing Fluid Pre-processing fluid 7 having the following prescription was prepared.

Lactic acid (88 percent): 7.5 percent by mass

Polyethylene wax oxide (CAS No. 68441-17-8)+cationic surfactant (solid component containing a solid portion of 0.65 percent by mass in the final composition): 2.5 percent by mass Ammonium lactate: 2 percent by mass Propylene glycol: 55 percent by mass Monoethylene glycol (MEG): 2.5 percent by mass Defoaming agent (Lumiten$^{trademark}$: 0.2 percent by mass Humectant (BYK-3410): 0.35 percent by mass Deionized water: balance (100 percent by mass in total)

pH was adjusted to pH 3 to 4 by sodium acetate.

*1: Stock of wax colloid is as follows (proportion is represented in percent by mass of the entire of stock of wax colloid):

CERAFLOUR$^{trademark}$ 950 wax particle having a melting point of 145 degrees C.: 35 percent by mass Tego Dispertrademark 750: surfactant: 15 percent by mass Deionized water: 50 percent by mass Preparation Example 1 of Liquid Dispersion of Pigment Preparation of Pigmented Liquid Dispersion 1

A total of 40 parts of titanium oxide (JR-405, manufactured by TAYCA CORPORATION), 5 parts of a pigment dispersant (TEGO Dispers 651, manufactured by Evonik Japan Co., Ltd.), and 55 parts of water were mixed followed by dispersion at 8 m/s for five minutes using a bead mill (Research Labo, manufactured by Shinmaru Enterprises Corporation) with zirconia beads having 0.3 mm diameter with a filling ratio of 60 percent to obtain a liquid dispersion 1 of white pigment (solid portion of 40 percent by mass).

The volume average particle diameter D50 of the pigment liquid dispersion 1 was measured with Nanotrac Wave-EX1500, manufactured by MicrotracBEL Corp. It was 210 nm.

Preparation Example 1 of Liquid Dispersion of Resin

Preparation of Liquid Dispersion of Resin

In a nitrogen-substituted container equipped with a thermometer, a nitrogen gas-introducing tube, and a stirrer, 200.4 g of polyester polyol, PTMG 1,000, average molecular weight of 1,000, manufactured by Mitsubishi Chemical Corp., 15.7 g of 2,2-dimethylol propionic acid, 48.0 g of isophorone diisocyanate, and 77.1 g of methyl ethyl ketone as an organic solvent were allowed to react using 0.06 g of dibutyltin dilaurate, DMTDL, manufactured by Tokyo Chemical Industry Co., Ltd. as a catalyst. Four hours later, 30.7 g of methylethyl ketone was supplied as a diluting agent to continue the reaction. After continuing the reaction for 6 hours in total, 1.4 g of methanol was added to complete the reaction, thereby obtaining an organic solvent solution of urethane resin. To the organic solvent solution, 13.4 g of a 48 percent by mass aqueous solution of potassium hydroxide was added to neutralize the carboxyl group the urethane resin had. Next, 715.3 g of water was added and adequately stirred, followed by aging and removal of the solvent to obtain a liquid dispersion of polyester urethane resin containing resin particles having a solid content concentration of 30 percent by mass.

Manufacturing Examples 1 to 24 of Ink

Preparation of Ink 1 to 24

Inks were prepared according to a typical method based on the prescription and proportion shown in Tables 2 to 5, followed by a membrane filter of cellulose acetate film having an average pore diameter of 5.0 μm, to obtain inks 1 to 24. The proportion of the individual components in Tables 2 to 5 are represented in percent by mass.

TABLE 2

| | | Ink No. | | | | | |
|---|---|---|---|---|---|---|---|
| | | 1 | 2 | 3 | 4 | 5 | 6 |
| Pigment | Pigmented liquid dispersion 1 (titanium oxide) | 10.00 | 10.00 | 10.00 | 10.00 | 10.00 | 10.00 |
| Organic solvent | Propylene glycol | 20.00 | 20.00 | 20.00 | 20.00 | 20.00 | 20.00 |
| | SOLFIT MMB | 5.00 | 5.00 | 5.00 | 5.00 | 5.00 | 5.00 |
| | 1,3-butane diol | | | | | | |
| | Glycerin | 1.00 | | | | | |
| Polyol compound or glycolether compound having 8 to 11 carbon atoms | 2-ethyl-1,3-hexane diol | | | | | | |
| | 2,2,4-trimethyl-1,3-pentane diol | | 1.00 | | | | |
| | Ethylene glycol monoethyl ether | | | 1.00 | 1.00 | 1.00 | 1.00 | 1.00 |
| | Ethylene glycol monobutyl ether | | | | | | |
| Resin having cross-linkable functional group | Polyester urethane resin (Preparation Example 1) | 10.00 | | | | | |
| | Urethane resin TAKELAC ™ W-6110 | | 10.00 | 10.00 | 10.00 | 10.00 | 10.00 |
| | Urethane resin SUPERFLEX ® 460 | | | | | | |
| Cross-linking Agent | Polymer having an oxazoline group K-2035E | | 0.30 | 1.00 | 1.00 | 1.00 | 1.50 |
| | Polymer having an oxazoline group K-2010E | | | | | | |
| | Carbodiimide compound E-02 | | | | | | |
| | Block isocyanate compound BN-77 | 1.00 | | | | | |
| | Aziridine PZ-33 | | | | | | |
| pH regulator | 2-amino-2-ethyl-1,3-propane diol | 0.30 | 0.30 | 0.30 | | | 0.30 |
| | 2-amino-2-methyl-1,3-propane diol | | | | | | |
| | Triethylamine | | | | 0.30 | | |
| | Sodium hydroxide | | | | | 0.30 | |
| Surfactant | SAG-503A | 0.10 | | | | | |
| | BYK-348 | | 0.10 | 0.10 | 0.10 | 0.10 | 0.10 |
| Defoaming agent | AD01 | 0.50 | 0.50 | 0.50 | 0.50 | 0.50 | 0.50 |
| Preservatives and fungicides | PROXEL LV | 0.05 | 0.05 | 0.05 | 0.05 | 0.05 | 0.05 |
| Water | Highly pure water | Balance | Balance | Balance | Balance | Balance | Balance |
| Total (percent by mass) | | 100.00 | 100.00 | 100.00 | 100.00 | 100.00 | 100.00 |

TABLE 3

| | | Ink No. | | | | | |
|---|---|---|---|---|---|---|---|
| | | 7 | 8 | 9 | 10 | 11 | 12 |
| Pigment | Pigmented liquid dispersion 1 (titanium oxide) | 10.00 | 10.00 | 10.00 | 10.00 | 10.00 | 10.00 |
| Organic solvent | Propylene glycol | 20.00 | 20.00 | 20.00 | 20.00 | 20.00 | 20.00 |
| | SOLFIT MMB | 5.00 | 5.00 | | | | |
| | 1,3-butane diol | | | 5.00 | 5.00 | 5.00 | 5.00 |
| | Glycerin | | | | | | |
| Polyol compound or glycolether compound having 8 to 11 carbon atoms | 2-ethyl-1,3-hexane diol | | | | 0.50 | 2.00 | 0.30 |
| | 2,2,4-trimethyl-1,3-pentane diol | | | | | | |
| | Ethylene glycol monoethyl ether | 1.00 | 1.00 | | | | |
| | Ethylene glycol monobutyl ether | | | | | | |

TABLE 3-continued

|  |  | Ink No. | | | | | |
| --- | --- | --- | --- | --- | --- | --- | --- |
|  |  | 7 | 8 | 9 | 10 | 11 | 12 |
| Resin having cross-linkable functional group | Polyester urethane resin (Preparation Example 1) |  |  | 10.00 | 10.00 | 10.00 | 10.00 |
|  | Urethane resin TAKELAC ™ W-6110 | 10.00 | 10.00 |  |  |  |  |
|  | Urethane resin SUPERFLEX ® 460 |  |  |  |  |  |  |
| Cross-linking Agent | Polymer having an oxazoline group K-2035E | 0.10 | 2.00 | 1.00 | 1.00 | 1.00 | 1.00 |
|  | Polymer having an oxazoline group K-2010E |  |  |  |  |  |  |
|  | Carbodiimide compound E-02 |  |  |  |  |  |  |
|  | Block isocyanate compound BN-77 |  |  |  |  |  |  |
|  | Aziridine PZ-33 |  |  |  |  |  |  |
| pH regulator | 2-amino-2-ethyl-1,3-propane diol | 0.30 | 0.30 | 0.30 | 0.30 | 0.30 | 0.30 |
|  | 2-amino-2-methyl-1,3-propane diol |  |  |  |  |  |  |
|  | Triethylamine |  |  |  |  |  |  |
|  | Sodium hydroxide |  |  |  |  |  |  |
| Surfactant | SAG-503A |  |  | 0.10 | 0.10 | 0.10 | 0.10 |
|  | BYK-348 | 0.10 | 0.10 |  |  |  |  |
| Defoaming agent | AD01 | 0.50 | 0.50 | 0.50 | 0.50 | 0.50 | 0.50 |
| Preservatives and fungicides | PROXEL LV | 0.05 | 0.05 | 0.05 | 0.05 | 0.05 | 0.05 |
| Water | Highly pure water | Balance | Balance | Balance | Balance | Balance | Balance |
|  | Total (percent by mass) | 100.00 | 100.00 | 100.00 | 100.00 | 100.00 | 100.00 |

TABLE 4

|  |  | Ink No. | | | | | |
| --- | --- | --- | --- | --- | --- | --- | --- |
|  |  | 13 | 14 | 15 | 16 | 17 | 18 |
| Pigment | Pigmented liquid dispersion 1 (titanium oxide) | 10.00 | 10.00 | 10.00 | 10.00 | 10.00 | 10.00 |
| Organic solvent | Propylene glycol | 20.00 | 20.00 | 20.00 | 20.00 | 20.00 | 20.00 |
|  | SOLFIT MMB |  | 5.00 | 5.00 |  |  |  |
|  | 1,3-Butane diol | 5.00 |  |  | 5.00 | 5.00 | 5.00 |
|  | Glycerin |  |  |  |  | 1.00 |  |
| Polyol compound or glycolether compound having 8 to 11 carbon atoms | 2-Ethyl-1,3-hexane diol | 2.50 |  |  |  |  |  |
|  | 2,2,4-trimethyl-1,3-pentane diol |  | 1.00 |  |  |  |  |
|  | Ethylene glycol monoethyl ether |  |  | 1.00 |  | 1.00 |  |
|  | Ethylene glycol monobutyl ether |  |  |  | 1.00 |  | 1.00 |
| Resin having cross-linkable functional group | Polyester urethane resin (Preparation Example 1) | 10.00 |  |  |  | 10.00 |  |
|  | Urethane resin TAKELAC ™ W-6110 |  |  |  | 10.00 |  | 10.00 |
|  | Urethane resin SUPERFLEX ® 460 |  | 10.00 | 10.00 |  |  |  |

TABLE 4-continued

|  |  | Ink No. | | | | | |
| --- | --- | --- | --- | --- | --- | --- | --- |
|  |  | 13 | 14 | 15 | 16 | 17 | 18 |
| Cross-linking Agent | Polymer having an oxazoline group K-2035E | 1.00 |  |  |  | 1.00 |  |
|  | Polymer having an oxazoline group K-2010E |  |  |  |  |  |  |
|  | Carbodiimide compound E-02 |  | 1.00 |  | 1.00 |  |  |
|  | Block isocyanate compound BN-77 |  |  | 1.00 |  |  |  |
|  | Aziridine PZ-33 |  |  |  |  |  |  |
| pH regulator | 2-amino-2-ethyl-1,3-propane diol | 0.30 |  |  |  |  | 0.30 |
|  | 2-amino-2-methyl-1,3-propane diol |  |  |  |  |  |  |
|  | Triethylamine |  | 0.30 | 0.30 | 0.30 | 0.30 |  |
|  | Sodium hydroxide |  |  |  |  |  |  |
| Surfactant | SAG-503A | 0.10 |  | 0.10 |  | 0.10 | 0.10 |
|  | BYK-348 |  | 0.10 |  | 0.10 |  |  |
| Defoaming agent | AD01 | 0.50 | 0.50 | 0.50 | 0.50 | 0.50 | 0.50 |
| Preservatives and fungicides | PROXEL LV | 0.05 | 0.05 | 0.05 | 0.05 | 0.05 | 0.05 |
| Water | Highly pure water | Balance | Balance | Balance | Balance | Balance | Balance |
|  | Total (percent by mass) | 100.00 | 100.00 | 100.00 | 100.00 | 100.00 | 100.00 |

TABLE 5

|  |  | Ink No. | | | | | |
| --- | --- | --- | --- | --- | --- | --- | --- |
|  |  | 19 | 20 | 21 | 22 | 23 | 24 |
| Pigment | Pigmented liquid dispersion 1 (titanium oxide) | 10.00 | 10.00 | 10.00 | 10.00 | 10.00 | 10.00 |
| Organic solvent | Propylene glycol | 20.00 | 20.00 | 20.00 | 20.00 | 20.00 | 20.00 |
|  | SOLFIT MMB |  |  |  | 5.00 | 5.00 | 5.00 |
|  | 1,3-Butane diol | 5.00 | 5.00 | 5.00 |  |  |  |
|  | Glycerin |  |  |  |  |  |  |
| Polyol compound or glycolether compound having 8 to 11 carbon atoms | 2-ethyl-1,3-hexane diol |  |  |  |  | 1.00 |  |
|  | 2,2,4-trimethyl-1,3-pentane diol |  |  |  |  |  |  |
|  | Ethylene glycol monoethyl ether |  |  |  | 1.00 |  | 1.00 |
|  | Ethylene glycol monobutyl ether | 1.00 | 1.00 | 1.00 |  |  |  |
| Resin having cross-linkable functional group | Polyester urethane resin (Preparation Example 1) |  |  |  |  |  |  |
|  | Urethane resin TAKELAC ™ W-6110 | 10.00 |  | 10.00 | 10.00 | 10.00 | 10.00 |
|  | Urethane resin SUPERFLEX ® 460 |  |  |  |  |  |  |
| Cross-linking Agent | Polymer having an oxazoline group K-2035E | 1.00 |  |  | 1.00 |  | 0.50 |
|  | Polymer having an oxazoline group K-2010E |  |  |  |  | 1.00 | 0.50 |
|  | Carbodiimide compound E-02 |  |  |  |  |  |  |
|  | Block isocyanate compound BN-77 |  |  | 1.00 |  |  |  |
|  | Aziridine PZ-33 |  |  |  |  | 1.00 |  |

TABLE 5-continued

| | | Ink No. | | | | | |
|---|---|---|---|---|---|---|---|
| | | 19 | 20 | 21 | 22 | 23 | 24 |
| pH regulator | 2-amino-2-ethyl-1,3-propane diol | | | | | 0.30 | 0.30 |
| | 2-amino-2-methyl-1,3-propane diol | | | | 0.30 | | |
| | Triethylamine | | 0.30 | 0.30 | | | |
| | Sodium hydroxide | | | | | | |
| Surfactant | SAG-503A | 0.10 | 0.10 | 0.10 | | | |
| | BYK-348 | | | | 0.10 | 0.10 | 0.10 |
| Defoaming agent | AD01 | 0.50 | 0.50 | 0.50 | 0.50 | 0.50 | 0.50 |
| Preservatives and fungicides | PROXEL LV | 0.05 | 0.05 | 0.05 | 0.05 | 0.05 | 0.05 |
| Water | Highly pure water | Balance | Balance | Balance | Balance | Balance | Balance |
| Total (percent by mass) | | 100.00 | 100.00 | 100.00 | 100.00 | 100.00 | 100.00 |

The individual components in Tables 2 to 5 are detailed as follows.

Organic Solvent
  SOLFIT MMB: 3-methoxy-3-methyl-1-butanol (manufactured by KURARAY CO., LTD.) Resin Having Cross-linkable Functional Group
  TAKELAC™ W-6110: Urethane resin, manufactured by Mitsui Chemicals, Inc.
  SUPERFLEX® 460: Urethane resin, manufactured by DKS Co., Ltd.
Cross-Linking Agent
  K-2035E: Polymer having an oxazoline group, manufactured by NIPPON SHOKUBAI CO., LTD.
  K2010E: Polymer having an oxazoline group, manufactured by NIPPON SHOKUBAI CO., LTD.
  CARBODILITE E-02: Carbodiimide compound, manufactured by Nisshinbo Chemical Inc.
  ELASTRON BN-77: Block isocyanate compound, manufactured by DKS Co., Ltd.
  Aziridine compound: PZ-33, manufactured by NIPPON SHOKUBAI CO., LTD.
Surfactant
  SAG-503A, silicone-based surfactant, manufactured by Nissin Chemical co., ltd.
  BYK-348: Silicone-based surfactant, manufactured by BYK-Chemie GmbH
Defoaming Agent
  AD01, EnviroGem AD01, manufactured by Air Products & Chemicals Inc.
Preservatives and Fungicides
  PROXEL LV, manufactured by AVECIA Inc.

Example 1

Preparation of Printed Matter

Processing fluid 1 was loaded in an inkjet printer (Ri100, manufactured by Ricoh Co., Ltd. Ricoh Co., Ltd.). The printer applied the processing fluid 1 to dark color cotton (dark color cotton T-shirt, Printstar 00085-CVT Black, manufactured by TOMS CO., LTD.) cut to the A4 size in an amount of 3.0 mg/cm².

Immediately thereafter, ink 1 was loaded in an inkjet printer Ri2000, manufactured by Ricoh Co., Ltd. The printer applied ink 1 by wet-on-wet printing to the region of the dark color cotton where the processing fluid 1 was already applied in an amount of 200 mg/cm² to form a solid image.

Thereafter, the solid image was dried in a heated wind circulating thermostatic chamber at 160 degrees C. for 90 seconds to prepare printed matter of Example 1.

Example 22

Processing fluid 1 was loaded in an automatic spray applicator (EZPrep$^{trademark}$ Pretreatment System for Direct-Garment Printing, manufactured by The M&R Companies). The applicator applied the processing fluid 1 to dark color cotton (dark color cotton T-shirt, Printstar 00085-CVT Black, manufactured by Ricoh Co., Ltd. TOMS CO., LTD.) cut to the A4 size in an amount of 9.0 mg/cm².

Next, the cotton was dried by a heat press at 120 degrees C. for 60 seconds.

Thereafter, ink 10 was loaded in an inkjet printer Ri2000, manufactured by Ricoh Co., Ltd. The printer applied ink 10 by dry-on-wet printing to the region of the dark color cotton where the processing fluid 1 was already applied in an amount of 200 mg/cm² to form a solid image.

Thereafter, the solid image was dried in a heated wind circulating thermostatic chamber at 180 degrees C. for 90 seconds to prepare printed matter of Example 22.

Examples 2 to 21, 24, and 28 to 32

Printed matter of Examples 2 to 21, 24, and 28 to 32 were prepared in the same manner as in Example 1 except that the conditions were changed to those shown in Table 6.

Example 23

Printed matter of Example 23 was obtained in the same manner as in Example 22 except that the conditions were changed to those shown in Table 6.

Example 25

Processing fluid 1 was loaded in an inkjet printer (Ri100, manufactured by Ricoh Co., Ltd. Ricoh Co., Ltd.). The printer applied the processing fluid 1 to dark color polyester (dark color dry T-shirt, Glimmer 00300-ACT Black, manufactured by TOMS CO., LTD.) cut to the A4 size in an amount of 6.0 mg/cm².

Immediately thereafter, ink 10 was loaded in an inkjet printer Ri2000, manufactured by Ricoh Co., Ltd. The printer applied ink 1 by wet-on-wet printing to the region of the dark color polyester where the processing fluid 1 was already applied in an amount of 200 mg/cm² to form a solid image.

Thereafter, the solid image was dried in a heated wind circulating thermostatic chamber at 120 degrees C. for 90 seconds to prepare printed matter of Example 25.

Example 26

Processing fluid 1 was loaded in an automatic spray applicator. The applicator applied the processing fluid 1 to dark color polyester (dark color dry T-shirt, Glimmer 00300-ACT Black, manufactured by TOMS CO., LTD.) cut to the A4 size in an amount of 9.0 mg/cm².

Next, the polyester was dried by a heat press at 120 degrees C. for 60 seconds.

Thereafter, ink 10 was loaded in an inkjet printer Ri2000, manufactured by Ricoh Co., Ltd. The printer applied ink 10 by dry-on-wet printing to the region of the dark color polyester where the processing fluid 1 was already applied in an amount of 200 mg/cm² to form a solid image.

Thereafter, the solid image was dried in a heated wind circulating thermostatic chamber at 120 degrees C. for 90 seconds to prepare printed matter of Example 26.

Example 27

Printed matter of Example 27 was obtained in the same manner as in Example 26 except that the conditions were changed to those shown in Table 6.

Examples 1 and 3 to 5

Printed matter of Comparative Examples 1 and 3 to 5 were prepared in the same manner as in Example 1 except that the conditions were changed to those shown in Table 6.

Comparative Example 2

Printed matter of Comparative Example 2 was obtained in the same manner as in Example 25 except that the conditions were changed to those shown in Table 6.

TABLE 6

| | Print medium | Processing fluid No. | Amount of processing fluid attached (mL/m²) | Processing Fluid Application | Ink No. | Method of printing |
|---|---|---|---|---|---|---|
| Example 1 | dark color cotton | Processing fluid 1 | 3.0 | Inkjet | Ink 1 | Wet-on-wet |
| Example 2 | dark color cotton | Processing fluid 2 | 3.0 | Inkjet | Ink 2 | Wet-on-wet |
| Example 3 | dark color cotton | Processing fluid 2 | 3.0 | Inkjet | Ink 3 | Wet-on-wet |
| Example 4 | dark color cotton | Processing fluid 2 | 3.0 | Inkjet | Ink 4 | Wet-on-wet |
| Example 5 | dark color cotton | Processing fluid 2 | 3.0 | Inkjet | Ink 5 | Wet-on-wet |
| Example 6 | dark color cotton | Processing fluid 2 | 3.0 | Inkjet | Ink 6 | Wet-on-wet |
| Example 7 | dark color cotton | Processing fluid 2 | 3.0 | Inkjet | Ink 7 | Wet-on-wet |
| Example 8 | dark color cotton | Processing fluid 2 | 3.0 | Inkjet | Ink 8 | Wet-on-wet |
| Example 9 | dark color cotton | Processing fluid 3 | 3.0 | Inkjet | Ink 9 | Wet-on-wet |
| Example 10 | dark color cotton | Processing fluid 3 | 3.0 | Inkjet | Ink 10 | Wet-on-wet |
| Example 11 | dark color cotton | Processing fluid 3 | 3.0 | Inkjet | Ink 11 | Wet-on-wet |
| Example 12 | dark color cotton | Processing fluid 3 | 3.0 | Inkjet | Ink 12 | Wet-on-wet |
| Example 13 | dark color cotton | Processing fluid 3 | 3.0 | Inkjet | Ink 13 | Wet-on-wet |
| Example 14 | dark color cotton | Processing fluid 4 | 3.0 | Inkjet | Ink 14 | Wet-on-wet |
| Example 15 | dark color cotton | Processing fluid 4 | 3.0 | Inkjet | Ink 15 | Wet-on-wet |
| Example 16 | dark color cotton | Processing fluid 4 | 3.0 | Inkjet | Ink 16 | Wet-on-wet |
| Example 17 | dark color cotton | Processing fluid 4 | 3.0 | Inkjet | Ink 17 | Wet-on-wet |
| Example 18 | dark color cotton | Processing fluid 1 | 0.5 | Inkjet | Ink 10 | Wet-on-wet |
| Example 19 | dark color cotton | Processing fluid 1 | 0.8 | Inkjet | Ink 10 | Wet-on-wet |
| Example 20 | dark color cotton | Processing fluid 1 | 6.0 | Inkjet | Ink 10 | Wet-on-wet |
| Example 21 | dark color cotton | Processing fluid 1 | 9.0 | Inkjet | Ink 10 | Wet-on-wet |
| Example 22 | dark color cotton | Processing fluid 1 | 9.0 | Spraying | Ink 10 | Dry-on-wet |
| Example 23 | dark color cotton | Processing fluid 1 | 11.0 | Spraying | Ink 10 | Dry-on-wet |

TABLE 6-continued

| | Print medium | Processing fluid No. | Amount of processing fluid attached (mL/m$^2$) | Processing Fluid Application | Ink No. | Method of printing |
|---|---|---|---|---|---|---|
| Example 24 | dark color cotton | Processing fluid 5 | 3.0 | Inkjet | Ink 10 | Wet-on-wet |
| Example 25 | dark color polyester | Processing fluid 1 | 6.0 | Inkjet | Ink 10 | Wet-on-wet |
| Example 26 | dark color polyester | Processing fluid 1 | 9.0 | Spraying | Ink 10 | Dry-on-wet |
| Example 27 | dark color polyester | Processing fluid 1 | 11.0 | Spraying | Ink 10 | Dry-on-wet |
| Example 28 | dark color cotton | Processing fluid 6 | 3.0 | Inkjet | Ink 10 | Wet-on-wet |
| Example 29 | dark color cotton | Processing fluid 7 | 3.0 | Inkjet | Ink 10 | Wet-on-wet |
| Example 30 | dark color cotton | Processing fluid 1 | 3.0 | Inkjet | Ink 22 | Wet-on-wet |
| Example 31 | dark color cotton | Processing fluid 1 | 3.0 | Inkjet | Ink 23 | Wet-on-wet |
| Example 32 | dark color cotton | Processing fluid 1 | 3.0 | Inkjet | Ink 24 | Wet-on-wet |
| Comparative Example 1 | dark color cotton | Processing fluid 4 | 3.0 | Inkjet | Ink 18 | Wet-on-wet |
| Comparative Example 2 | dark color polyester | Processing fluid 4 | 3.0 | Inkjet | Ink 18 | Wet-on-wet |
| Comparative Example 3 | dark color cotton | Processing fluid 4 | 3.0 | Inkjet | Ink 19 | Wet-on-wet |
| Comparative Example 4 | dark color cotton | Processing fluid 4 | 3.0 | Inkjet | Ink 20 | Wet-on-wet |
| Comparative Example 5 | dark color cotton | Processing fluid 4 | 3.0 | Inkjet | Ink 21 | Wet-on-wet |

The storage stability of the ink for use in each Example and Comparative Example, twisting of the solid image portion of fabric after expansion, stickiness of printed matter, concealing by white, dry rubbing fastness, and flexibility of the printed matter manufactured in each Example and Comparative Example were evaluated in the following manner. The evaluation results are shown in Table 7.

Storage Stability of Ink

Each ink used in Examples and Comparative Examples was placed in a sealed container. The container was allowed to stand in a thermostatic chamber at 70 degrees C. for two weeks. The viscosity before and after the standing was measured to obtain the change ratio of viscosity. The storage stability was evaluated using this ratio according to the following criteria. The viscosity was measured with a cone plate rotary viscometer, VISCOMETER TV-22, manufactured by TOKI SANGYO CO., LTD. at a rate of rotation of 50 rpm, a temperature of hemathermal circulating water at 25 degrees C., and a shearing speed of 191.4 sec$^{-1}$. B− and higher grades are practically allowable.

Evaluation Criteria
A: Change ratio of viscosity from −5 percent to 5 percent
B+: Change ratio of viscosity from −10 percent to less than −5 percent and greater than 5 to 10 percent
B−: Change ratio of viscosity before and after storage from −15 percent to less than −10 percent and more than 10 to 15 percent
C: Change ratio of viscosity of less than −15 percent and greater than 15 percent Twisting of Solid Image Portion of Fabric After Expansion The twisting of the solid image portion of fabric after expansion for each printed matter of Examples and Comparative Examples was evaluated according to the following method and evaluation criteria. Printed matter cut to a size of 20 mm×80 mm was placed in a universal tester with a distance between the jig grippers of 40 mm, followed by expanding an equivalent of 30 percent, i.e., 12 mm, of the printed matter. After releasing the expansion force, the test piece was evaluated on twisting after expansion. B− and higher grades are allowable for practical purpose.

Evaluation Criteria
A: expansion was less than 15 percent
B+: expansion was from 15 to less than 20 percent
B−: expansion was from 20 to less than 25 percent
C: expansion was 25 percent or more Stickiness of Printed Matter Stickiness of printed matter prepared in Examples and Comparative Examples were evaluated according to the following evaluation criteria. B− and higher grades are allowable for practical purpose.

Evaluation Criteria
A: the print surface not sticky at all when touched
B+: the print surface slightly feels sticky when touched
B−: the print surface feels sticky when touched
C: the portion touched to the print surface becomes wet Concealing by White The color of the printed matter prepared in Examples and Comparative Examples was measured with X-rite exact, manufactured by X-rite, Inc. to calculate the degree of concealing by white according to the following relationship and the calculation results were evaluated according to the following evaluation criteria. B− and higher grades are allowable for practical purpose.

Degree of concealing by white (percent)=(OD of original fabric−OD of solid image)/(OD of original fabric)×100

Evaluation Criteria
A: Degree of concealing by white is 93 percent or more
B+: Degree of concealing by white is from 88 to less than 93 percent
B−: Degree of concealing by white is from 83 to less than 88 percent
C: Degree of concealing by white is less than 83 percent Dry Rubbing Fastness The printed matter prepared in each of Examples and Comparative Examples was subjected to the dry rubbing fastness test according to JIS L0849 II type format and its dry rubbing fastness was evaluated according to the following evaluation criteria. B− and higher grades are allowable for practical purpose.

Evaluation Criteria
A: Grade 4.0 or higher
B+: Grade 4.0
B: Grade 3.5
B−: Grade 3.0
C: Grade 2.5 or lower Flexibility The printed matter prepared in each of Examples and Comparative Examples was subjected to the flexibility test on bending resistance according to JIS L1069 E method format and its flexibility was evaluated according to the following evaluation criteria. B− and higher grades are allowable for practical purpose.

Evaluation Criteria
A: less than 40 g
B+: 40 to less than 55 g
B−: 55 to less than 70 g
C: 70 g or greater

TABLE 7

|  | Storage Stability of Ink | Twisting of solid image portion of fabric after expansion | Stickiness of printed matter | Concealing by White | Dry rubbing fastness | Flexibility |
|---|---|---|---|---|---|---|
| Example 1 | B− | B+ | A | A | B | B− |
| Example 2 | A | B+ | A | A | B | A |
| Example 3 | A | A | A | A | B+ | A |
| Example 4 | B− | A | A | A | B+ | A |
| Example 5 | A | B− | A | A | B− | A |
| Example 6 | B+ | A | A | A | B+ | B− |
| Example 7 | A | B− | A | A | B− | A |
| Example 8 | B− | A | A | A | B | B− |
| Example 9 | A | A | A | A | B+ | A |
| Example 10 | A | A | A | A | A | A |
| Example 11 | A | A | A | B+ | A | A |
| Example 12 | A | A | A | A | B+ | A |
| Example 13 | A | A | A | B− | A | A |
| Example 14 | B− | B− | A | A | B− | B+ |
| Example 15 | B− | B− | A | A | B− | B+ |
| Example 16 | B− | B− | A | A | B− | B+ |
| Example 17 | B− | A | A | A | B+ | A |
| Example 18 | A | A | A | B− | A | A |
| Example 19 | A | A | A | A | A | A |
| Example 20 | A | A | A | A | A | A |
| Example 21 | A | A | A | A | A | A |
| Example 22 | A | A | A | A | B+ | A |
| Example 23 | A | A | A | B+ | B− | B+ |
| Example 24 | A | A | A | B− | A | B− |
| Example 25 | A | A | B+ | A | A | A |
| Example 26 | A | A | B− | B+ | B+ | A |
| Example 27 | A | A | B− | B− | B− | B+ |
| Example 28 | A | A | A | B+ | B+ | B+ |
| Example 29 | A | A | A | B+ | B+ | B+ |
| Example 30 | A | A | A | A | B+ | A |
| Example 31 | A | B+ | A | A | A | A |
| Example 32 | B+ | B+ | A | A | B+ | A |
| Comparative Example 1 | A | C | A | B+ | C | A |
| Comparative Example 2 | A | C | B+ | B+ | C | A |
| Comparative Example 3 | C | A | A | B+ | B+ | A |
| Comparative Example 4 | B− | C | A | A | C | Unable to evaluate |
| Comparative Example 5 | C | B− | B+ | B+ | B− | B+ |

Aspects of the present disclosure are, for example, as follows.

1. A printing method includes applying a processing fluid to a fabric and applying an ink to the fabric to which the processing fluid has been applied, wherein the ink contains a pigment, a resin having a cross-linkable functional group, a pH regulator, and at least one member selected from the group consisting of a block isocyanate compound, a carbodiimide compound, and a polymer having an oxazoline group.

2. The printing method according to 1 mentioned above, wherein the pH regulator contains an amine compound having 4 to 8 carbon atoms.

3. The printing method according to 1 or 2 mentioned above, wherein the pH regulator contains 2-amino-2-ethyl-1,3-propane diol.

4. The printing method according to any one of 1 to 3 mentioned above, wherein the ink contains the polymer having an oxazoline group.

5. The printing method according to any one of 1 to 4 mentioned above, wherein the proportion of the at least one member is from 0.3 to 1.5 percent by mass to an entire of the ink.

6. The printing method according to any one of 1 to 5, wherein the ink further contains a polyol compound having 8 to 11 carbon at least one of atoms or a glycol ether compound 7. The printing method according to 6 mentioned above, wherein the polyol compound comprises 2-ethyl-1,3-hexanediol.

8. The printing method according to 6 or 7 mentioned above, wherein the proportion of the at least one of a polyol compound having 8 to 11 carbon atoms or a glycol ether compound is from 0.5 to 2 percent by mass to an entire of the ink.

9. The printing method according to any one of 1 to 8 mentioned above, wherein the pigment contains titanium oxide having a secondary particle diameter of from 200 to 300 nm.

10. The printing method according to any one of 1 to 9 mentioned above, wherein the processing fluid contains a flocculant, a humectant, and a surfactant.

11. The printing method according to 10 mentioned above, wherein the flocculant contains an inorganic salt, an organic salt, or a cationic polymer.

12. The printing method according to 10 or 11 mentioned above, wherein the processing fluid further contains a wax.

13. The printing method according to 12 mentioned above, wherein the wax contains at least one of oxidized polyethylene, carnauba wax, or a siloxane compound.

14. The printing method according to any one of 1 to 13 mentioned above, wherein the amount of the processing fluid attached to the fabric is from 0.8 to 9 mg/m$^2$.

15. The printing method according to any one of 1 to 14 mentioned above, wherein the processing fluid is applied by inkjetting.

16. The printing method according to any one of 1 to 15 mentioned above, wherein the processing fluid and the ink are applied by wet-on-wet printing.

17. The printing method according to any one of 1 to 16 mentioned above, wherein the fabric is a dark color fabric.

18. A printing device includes a processing fluid applying device for applying a processing fluid to a fabric and an ink applying device for applying an ink to the fabric to which the processing fluid has been applied, wherein the ink contains a pigment, a resin having a cross-linkable functional group, a pH regulator, and at least one member selected from the group consisting of a block isocyanate compound, a carbodiimide compound, and a polymer having an oxazoline group.

19. The printing method according to 18 mentioned above, wherein the amount of the processing fluid attached to the fabric is from 0.8 to 9 mg/m$^2$.

20. The inkjet printing device 18 or 19 mentioned above, wherein the processing fluid applhying device is an inkjet inke discharging device.

21. The printing device according to any one of 18 to 20, wherein the processing fluid and the ink are applied by wet-on-wet printing.

22. The printing device according to any one of 18 to 21 mentioned above, wherein the fabric is a dark color fabric.

23. Printed matter includes a fabric and a printed layer on the fabric, the printed layer being printed by the printing method of any one of 1 to 17 mentioned above.

24. The printed matter according to 23 mentioned above, wherein the fabric is a dark color fabric.

25. A set of a processing fluid for forming an image on a fabric and an ink that contains a pigment, a resin having a cross-linkable functional group, a pH regulator, and at least one member selected from the group consisting of a block isocyanate compound, a carbodiimide compound, and a polymer having an oxazoline group.

26. The set according to 25 mentioned above, wherein the fabric is a dark color fabric.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

The invention claimed is:

1. A printing method, comprising:
applying a processing fluid to a fabric; and
applying an ink to the fabric to which the processing fluid has been applied,
wherein the ink contains a pigment, a resin having a cross-linkable functional group, a pH regulator, and at least one member selected from the group consisting of a block isocyanate compound, a carbodiimide compound, and a polymer having an oxazoline group,
wherein the pH regulator contains an amine compound having 4 to 8 carbon atoms.

2. A printing method, comprising:
applying a processing fluid to a fabric; and
applying an ink to the fabric to which the processing fluid has been applied,
wherein the ink contains a pigment, a resin having a cross-linkable functional group, a pH regulator, and at least one member selected from the group consisting of a block isocyanate compound, a carbodiimide compound, and a polymer having an oxazoline group,
wherein the pH regulator contains 2-amino-2-ethyl-1,3-propane diol.

3. A printing method, comprising:
applying a processing fluid to a fabric; and
applying an ink to the fabric to which the processing fluid has been applied,
wherein the ink contains a pigment, a resin having a cross-linkable functional group, a pH regulator, and at least one member selected from the group consisting of a block isocyanate compound. a carbodiimide compound, and a polymer having an oxazoline group,
wherein the ink contains the polymer having an oxazoline group.

4. The printing method according to claim 1, wherein a proportion of the at least one member is from 0.3 to 1.5 percent by mass to an entire of the ink.

5. The printing method according to claim 1, wherein the ink further contains at least one of a polyol compound having 8 to 11 carbon atoms or a glycol ether compound.

6. The printing method according to claim 5, wherein the polyol compound contains 2-ethyl-1,3-hexane diol.

7. The printing method according to claim 5, wherein a proportion of the at least one of a polyol compound having 8 to 11 carbon atoms or a glycol ether compound is from 0.5 to 2 percent by mass to an entire of the ink.

8. The printing method according to claim 1, wherein the pigment contains titanium oxide having a secondary particle diameter of from 200 to 300 nm.

9. The printing method according to claim 1, wherein the processing fluid contains a flocculant, a humectant, and a surfactant.

10. The printing method according to claim 9, wherein the flocculant contains an inorganic salt, an organic salt, or a cationic polymer.

11. The printing method according to claim 9, wherein the processing fluid further contains a wax.

12. The printing method according to claim 11, wherein the wax contains at least one of oxidized polyethylene, carnauba wax, or a siloxane compound.

13. The printing method according to claim 1, wherein an amount of the processing fluid attached to the fabric is from 0.8 to 9 mg/m$^2$.

14. The printing method according to claim 1, wherein the processing fluid is applied by an inkjetting method.

15. The printing method according to claim 1, wherein the processing fluid and the ink are applied by wet-on-wet printing.

16. The printing method according to claim 1, wherein the fabric is a dark color fabric.

17. Printed matter, comprising:
a fabric; and
a printed layer printed on the fabric by the printing method of claim 1.

18. A printing device, comprising:
a processing fluid applying device configured to apply a processing fluid to a fabric; and an ink applying device configured to apply an ink to the fabric to which the processing fluid has been applied,
wherein the ink contains a pigment, a resin having a cross-linkable functional group, a pH regulator, and at least one member selected from the group consisting of a block isocyanate compound, a carbodiimide compound, and a polymer having an oxazoline group,
wherein the pH regulator contains an amine compound having 4 to 8 carbon atoms.

19. A printing device, comprising:
a processing fluid applying device configured to apply a processing fluid to a fabric; and an ink applying device configured to apply an ink to the fabric to which the processing fluid has been applied,
wherein the ink contains a pigment, a resin having a cross-linkable functional group, a pH regulator, and at least one member selected from the group consisting of a block isocyanate compound, a carbodiimide compound, and a polymer having an oxazoline group,
wherein the pH regulator contains 2-amino-2-ethyl-1,3-propane diol.

20. A printing device, comprising:
a processing fluid applying device configured to apply a processing fluid to a fabric; and an ink applying device configured to apply an ink to the fabric to which the processing fluid has been applied,
wherein the ink contains a pigment, a resin having a cross-linkable functional group, a pH regulator, and at least one member selected from the group consisting of a block isocyanate compound, a carbodiimide compound, and a polymer having an oxazoline group,
wherein the ink contains the polymer having an oxazoline group.

21. A set, comprising:
a processing fluid for forming an image on a fabric; and
an ink comprising:
a pigment;
a resin having a cross-linkable functional group;
a pH regulator; and
at least one member selected from the group consisting of a block isocyanate compound, a carbodiimide compound, and a polymer having an oxazoline group,
wherein the pH regulator contains an amine compound having 4 to 8 carbon atoms.

22. A set, comprising:
a processing fluid for forming an image on a fabric; and
an ink comprising:
a pigment;
a resin having a cross-linkable functional group;
a pH regulator; and
at least one member selected from the group consisting of a block isocyanate compound, a carbodiimide compound, and a polymer having an oxazoline group,
wherein the pH regulator contains 2-amino-2-ethyl-1,3-propane diol.

23. A set, comprising:
a processing fluid for forming an image on a fabric; and
an ink comprising:
a pigment;
a resin having a cross-linkable functional group;
a pH regulator; and
at least one member selected from the group consisting of a block isocyanate compound, a carbodiimide compound, and a polymer having an oxazoline group,
wherein the ink contains the polymer having an oxazoline group.

24. The printing method according to claim 2, wherein a proportion of the at least one member is from 0.3 to 1.5 percent by mass to an entire of the ink.

25. The printing method according to claim 2, wherein the ink further contains at least one of a polyol compound having 8 to 11 carbon atoms or a glycol ether compound.

26. The printing method according to claim 25, wherein a proportion of the at least one of a polyol compound having 8 to 11 carbon atoms or a glycol ether compound is from 0.5 to 2 percent by mass to an entire of the ink.

27. The printing method according to claim 2, wherein the processing fluid contains a flocculant, a humectant, and a surfactant.

28. The printing method according to claim 3, wherein a proportion of the at least one member is from 0.3 to 1.5 percent by mass to an entire of the ink.

29. The printing method according to claim 3, wherein the ink further contains at least one of a polyol compound having 8 to 11 carbon atoms or a glycol ether compound.

30. The printing method according to claim 29, wherein a proportion of the at least one of a polyol compound having 8 to 11 carbon atoms or a glycol ether compound is from 0.5 to 2 percent by mass to an entire of the ink.

31. The printing method according to claim 3, wherein the processing fluid contains a flocculant, a humectant, and a surfactant.

* * * * *